(12) United States Patent
Kimata

(10) Patent No.: US 10,431,864 B2
(45) Date of Patent: Oct. 1, 2019

(54) NON-RECIPROCAL CIRCUIT ELEMENT AND WIRELESS COMMUNICATION DEVICE

(71) Applicant: NEC Corporation, Tokyo (JP)

(72) Inventor: Yusuke Kimata, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 32 days.

(21) Appl. No.: 15/735,459

(22) PCT Filed: Jun. 14, 2016

(86) PCT No.: PCT/JP2016/002868
§ 371 (c)(1),
(2) Date: Dec. 11, 2017

(87) PCT Pub. No.: WO2017/010039
PCT Pub. Date: Jan. 19, 2017

(65) Prior Publication Data
US 2018/0183124 A1    Jun. 28, 2018

(30) Foreign Application Priority Data
Jul. 15, 2015  (JP) .................................. 2015-141343

(51) Int. Cl.
*H01P 1/387* (2006.01)
*H01Q 1/50* (2006.01)
*H04B 1/40* (2015.01)

(52) U.S. Cl.
CPC ............... *H01P 1/387* (2013.01); *H01Q 1/50* (2013.01); *H04B 1/40* (2013.01)

(58) Field of Classification Search
CPC ............. H01P 1/38; H01P 1/387; H01P 1/383
(Continued)

(56) References Cited

U.S. PATENT DOCUMENTS 5,017,894 A  *  5/1991  Naito ..................... H01P 1/383
                                                            333/1.1
5,223,805 A     6/1993  Talcott et al.
(Continued)

FOREIGN PATENT DOCUMENTS

JP    48-47242 A    7/1973
JP    59-112702 A   6/1984
(Continued)

OTHER PUBLICATIONS

International Search Report of PCT/JP2016/002868 dated Aug. 30, 2016.

*Primary Examiner* — Stephen E. Jones
(74) *Attorney, Agent, or Firm* — Sughrue Mion, PLLC

(57) ABSTRACT

The present surface mount technology non-reciprocal circuit element (1) includes a ferromagnetic material (14) placed above a circuit board (11), and a conductor cover (13). The conductor cover (13) is composed of a main unit (12) located above the ferromagnetic material (14) and connecting members (17_1, 17_2, 17_3) for electrically connecting the main unit (12) with transmission lines (18_1, 18_2, 18_3) on the circuit board (11), respectively. The ferromagnetic material (14) and at least one of the connecting members (17_1, 17_2, 17_3) are formed so as to create, in at least one of gaps between the side surface of the ferromagnetic material (14) and each of the connecting members (17_1, 17_2, 17_3), a location where a clearance between a side surface of the ferromagnetic material (14) and the connecting member is a first clearance and a location where it is a second clearance different from the first clearance.

9 Claims, 15 Drawing Sheets

(58) Field of Classification Search
USPC .................................................. 333/1.1, 24.2
See application file for complete search history.

(56) References Cited

U.S. PATENT DOCUMENTS

| | | | | |
|---|---|---|---|---|
| 2002/0008596 A1* | 1/2002 | Watanabe | ............... | H01P 1/387 |
| | | | | 333/1.1 |
| 2013/0321090 A1* | 12/2013 | Cruickshank | ........... | H01P 1/383 |
| | | | | 333/1.1 |
| 2014/0320228 A1 | 10/2014 | Orihashi | | |

FOREIGN PATENT DOCUMENTS

| JP | 2005-130022 A | 5/2005 |
|---|---|---|
| WO | 2013/088618 A1 | 6/2013 |

* cited by examiner

NON-RECIPROCAL CIRCUIT ELEMENT AND WIRELESS COMMUNICATION DEVICE

CROSS REFERENCE TO RELATED APPLICATIONS

This application is a National Stage of International Application No. PCT/JP2016/002868 filed Jun. 14, 2016, claiming priority based on Japanese Patent Application No. 2015-141343 filed Jul. 15, 2015, the contents of all of which are incorporated herein by reference in their entirety.

TECHNICAL FIELD

The present invention relates to a non-reciprocal circuit element and a wireless communication device and, particularly, relates to a non-reciprocal circuit element used as a high-frequency component of a ultra-compact microwave wireless communication system and a wireless communication device including the non-reciprocal circuit element.

BACKGROUND ART

In a wireless communication device such as an ultra-compact microwave wireless communication system, non-reciprocal circuit elements such as a circulator and an isolator are used in order to prevent contamination of a signal and load change in a power amplifier. A non-reciprocal circuit element is generally composed of a ferromagnetic material such as ferrite, a conductor (conductor cover) that applies a high-frequency magnetic field to the ferromagnetic material, a magnet that applies a direct-current field to a conductor and the like. The types of a non-reciprocal circuit element include a waveguide type where a ferromagnetic material is placed inside a waveguide and an SMT (Surface Mount Technology) type where the ferromagnetic material is placed on a transmission line formed on a dielectric substrate. As for the SMT non-reciprocal circuit element, if the same material as a PCB (Printed Circuit Board) is used for a dielectric substrate, the non-reciprocal circuit element can be integrated in the PCB.

The SMT type non-reciprocal circuit element, compared with the waveguide type, can be easily downsized and made with a smaller number of parts, thus enabling easier mounting. On the other hand, the SMT type, compared with the waveguide type, has a problem that the position of a conductor with respect to ferrite is likely to be displaced on a plane parallel to a dielectric substrate surface due to assembly errors at the time of mounting. In order to reduce the displacement of the position of a conductor with respect to ferrite on a plane parallel to a dielectric substrate surface, the SMT non-reciprocal circuit element where the positioning of the side surface (outer surface) of a ferromagnetic material whose lower surface is placed on a transmission line is carried out by the three-point support with protrusions is disclosed, for example, in Patent Literature 1.

CITATION LIST

Patent Literature

PTL1: Japanese Unexamined Patent Application Publication No. 2005-130022

SUMMARY OF INVENTION

Technical Problem

The widely known SMT non-reciprocal circuit element is one having a conductor cover composed of a main unit that covers the upper surface of ferrite and a plurality of connecting members that radiate from the outer edge of the main unit into transmission lines. The present inventors have made intensive studies and, as a result, have found that, by narrowing the gap between the side surface (outer surface) of ferrite and the connecting members of the conductor cover in the SMT non-reciprocal circuit element, the impedance converges and broadband characteristics can be easily achieved. However, it has also been found that, if a non-reciprocal circuit element is designed to have a narrower gap between the side surface of ferrite and the connecting members of the conductor cover, there is a case where return loss (reflection loss), which is one of the characteristics of a non-reciprocal circuit element, is degraded due to the displacement of the position of the conductor cover with respect to the ferrite on a plane parallel to a dielectric substrate surface, which occurs at the time of mounting.

One way to suppress the degradation of return loss due to the assembly errors described above in the SMT non-reciprocal circuit element is to carry out the positioning of a conductor cover at the time of mounting to thereby reduce the displacement of a conductor cover with respect to ferrite on a plane parallel to a dielectric substrate surface. However, even if the positioning of a conductor cover is carried out by the method disclosed in Patent Literature 1, the position of the conductor cover with respect to ferrite is not at a desired position due to fluctuations in the measurements of components such as the conductor cover, the ferrite and the dielectric substrate, which makes it impossible to suppress the degradation of return loss in some cases.

The present invention has been accomplished to solve the above problems and an exemplary object of the present invention is thus to provide a circulator and a wireless communication device that can achieve broadband characteristics and reduce the degradation of return loss due to assembly errors (displacement of a conductor cover with respect to ferrite on an XY plane) at the time of mounting.

Solution to Problem

According to an exemplary aspect of the present invention, a surface mount technology non-reciprocal circuit element includes a ferromagnetic material placed above a circuit board; and a conductor cover composed of a main unit located above the ferromagnetic material and a plurality of connecting members for electrically connecting the main unit with each of a plurality of transmission lines on the circuit board, wherein the ferromagnetic material and at least one of the connecting members are formed so as to create, in at least one of gaps between the side surface of the ferromagnetic material and each of the plurality of connecting members, a location where a clearance between a side surface of the ferromagnetic material and the connecting member is a first clearance and a location where the clearance is a second clearance different from the first clearance.

Advantageous Effects of Invention

According to the exemplary aspect of the present invention, it is possible to achieve broadband characteristics and reduce the degradation of return loss due to assembly errors (displacement of a conductor cover with respect to ferrite on an XY plane) at the time of mounting.

DESCRIPTION OF EMBODIMENTS

[Characteristics of the Present Invention]

Prior to describing exemplary embodiments of the present invention, the overview of the characteristics of the present invention are described first.

Figure 1:
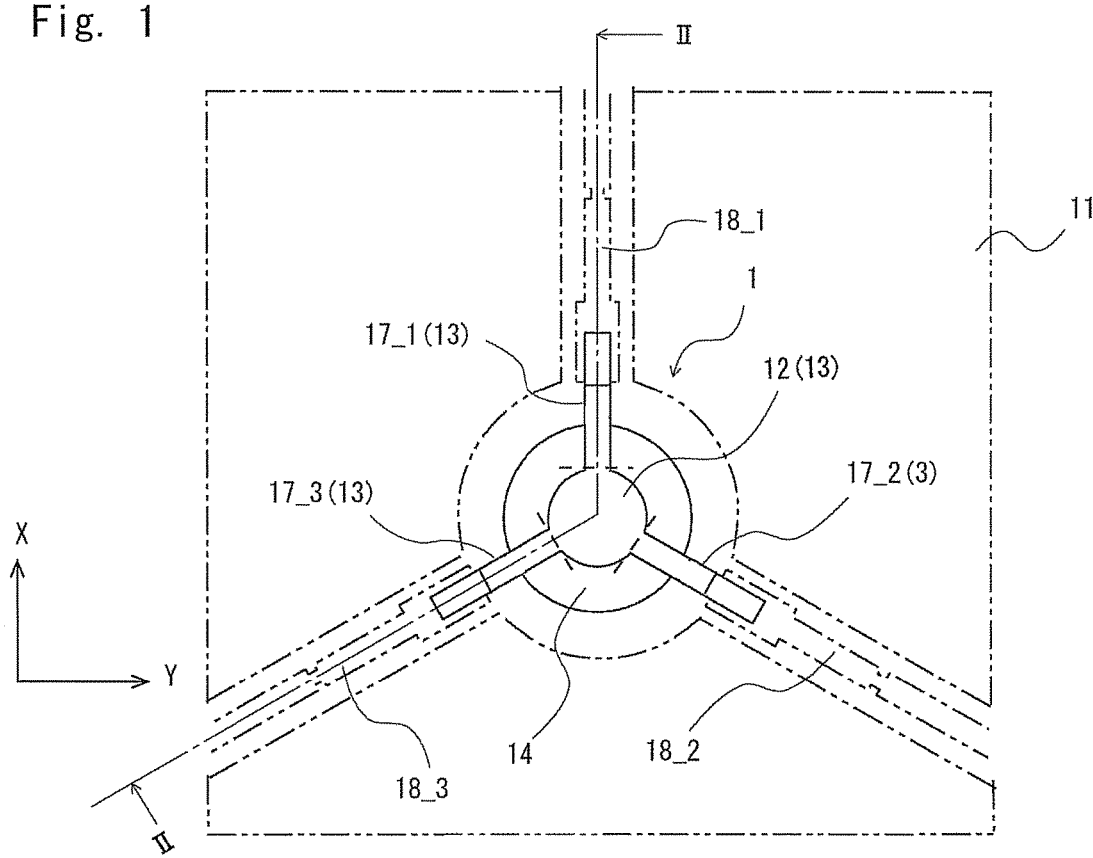
FIG. 1 is a view illustrating the overview of the present invention.
Figure 2:
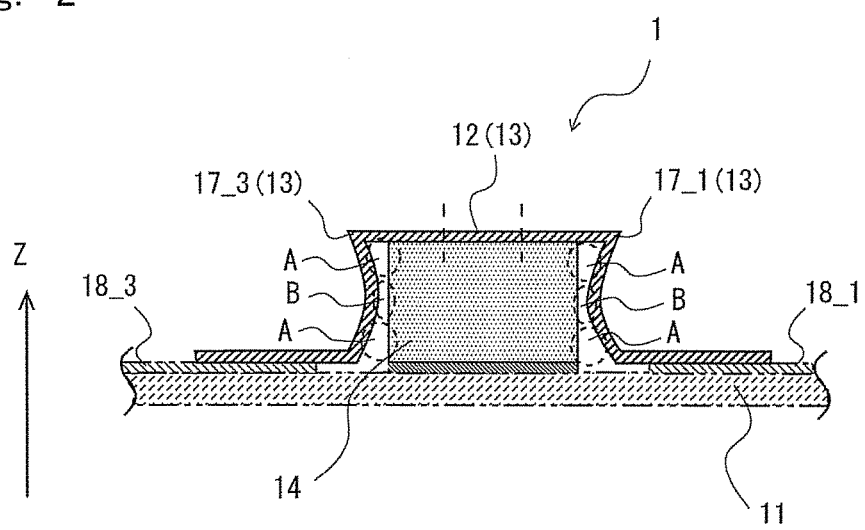
FIG. 2 is a view illustrating the overview of the present invention.

FIGS. 1 and 2 are views illustrating the overview of the present invention. FIG. 1 is a plan view showing an example of the schematic structure of the present invention, and the plane of a circuit board 11 is an XY plane. FIG. 2 is a cross-sectional view along line II-II in FIG. 1, and the direction perpendicular to the circuit board 11 surface is a Z-axis direction. As shown in FIGS. 1 and 2, a non-reciprocal circuit element 1 of the SMT type includes a ferromagnetic material 14 and a conductor cover 13. The lower surface of the ferromagnetic material 14 is placed on the circuit board 11. The conductor cover 13 is composed of a main unit 12 located above the ferromagnetic material 14 and a plurality of connecting members 17_1, 17_2 and 17_3 for electrically connecting the main unit 12 with each of a plurality of transmission lines 18_1, 18_2 and 18_3 on the circuit board 11.

The ferromagnetic material 14 and at least one of the connecting members 17_1, 17_2 and 17_3 are formed so as to create a location A where the clearance between the side surface of the ferromagnetic material 14 and the connecting member is a first clearance and a location B where it is a second clearance which is different from the first clearance in at least one of the gaps between the side surface of the ferromagnetic material 14 and the connecting members 17_1, 17_2 and 17_3.

According to the present invention, it is possible to achieve broadband characteristics and reduce the degradation of return loss due to assembly errors (displacement of a conductor cover with respect to ferrite on an XY plane) at the time of mounting.

First Exemplary Embodiment

A first exemplary embodiment of the present invention is described hereinafter with reference to the drawings.

Figure 3:
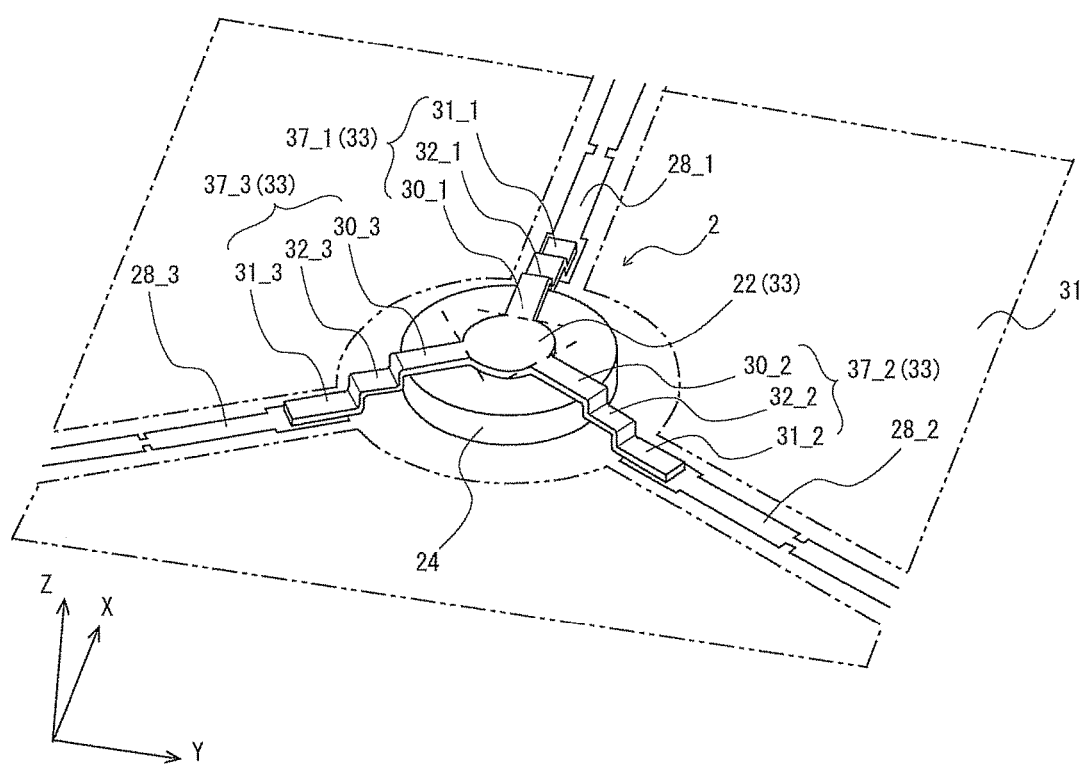
FIG. 3 is a perspective view showing the schematic structure of a circulator according to a first exemplary embodiment.
Figure 4:
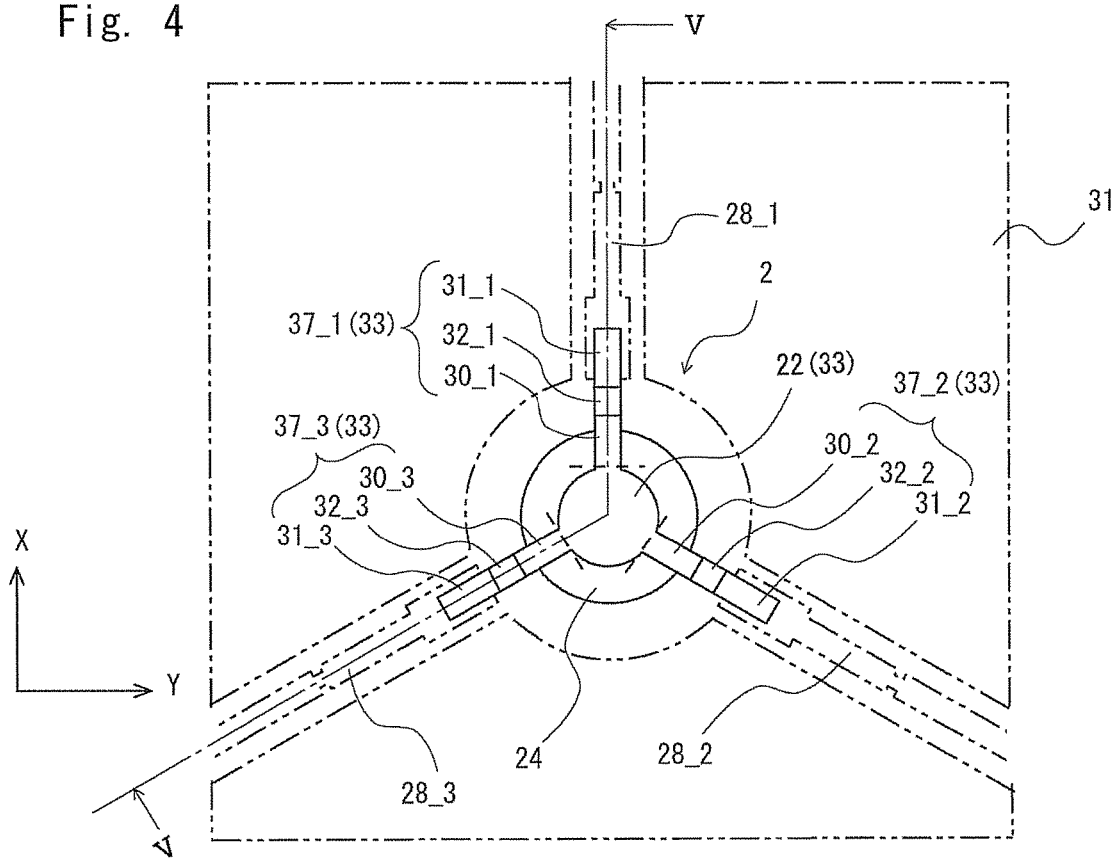
FIG. 4 is a plan view showing the schematic structure of the circulator according to the first exemplary embodiment.
Figure 5:
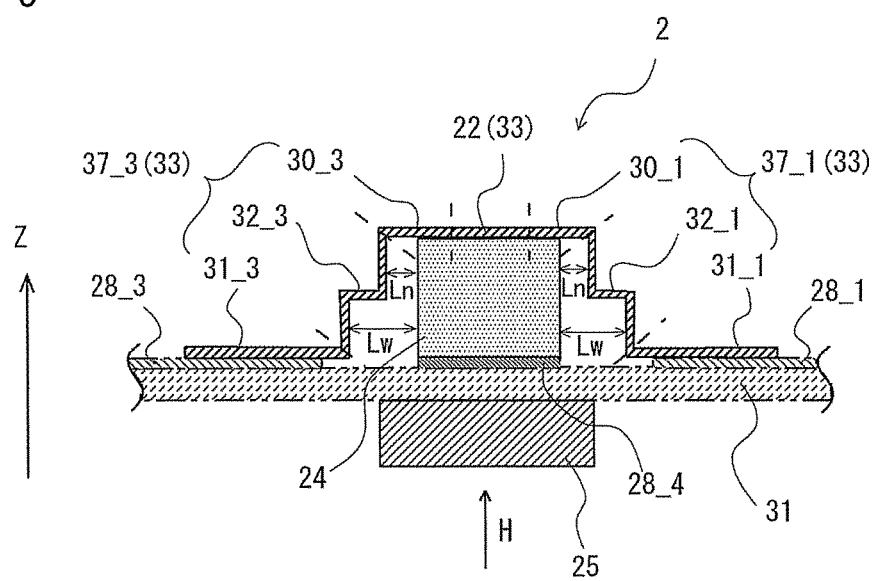
FIG. 5 is a cross-sectional view along line V-V in FIG. 4.

FIGS. 3 and 4 are a perspective view and a top view, respectively, showing an example of a circulator according to a first exemplary embodiment. FIG. 5 is a cross-sectional view along line V-V in FIG. 4. As shown in FIGS. 3 to 5, a circulator 2 as a non-reciprocal circuit element is an SMT (Surface Mount Technology) three-way circulator that is mounted on the surface of a circuit board 31. The circulator 2 includes a ferrite 24 as a ferromagnetic material with ferrimagnetism, a conductor cover 33, a permanent magnet 25 (see FIG. 5) and the like.

The circuit board 31 on which the circulator 2 is mounted is a PCB (Printed Circuit Board), which is a lamination of a dielectric layer and a metal layer. Note that the circuit board 31 is not limited to a PCB, and it may be a circuit board having another structure. A conductor pattern is formed on the upper surface and the lower surface of the circuit board 31. The conductor pattern is made up of transmission lines 28_1, 28_2 and 28_3 as signal lines and a ground pattern 28_4 (see FIG. 5). Further, the impedance can be matched by adjusting the pattern width and the pattern length of the transmission lines 28_1, 28_2 and 28_3. The transmission lines 28_1, 28_2 and 28_3 are made of a conductive material such as metal.

The transmission lines 28_1, 28_2 and 28_3 are formed in a substantially Y shape on the upper surface of the circuit board 31. The transmission lines may be formed on the circuit board 31 so that the angle between the direction of the transmission line 28_1 and the direction of the transmission line 28_2, the angle between the direction of the transmission line 28_2 and the direction of the transmission line 28_3 and the angle between the direction of the transmission line 28_3 and the direction of the transmission line 28_1 are each 120 degrees. Note that, in FIGS. 3 and 4, the plane of the circuit board 31 is an XY plane, and the extending direction of the transmission line 28_1 (the longitudinal direction of the transmission line 28_1) is an X-axis direction. Further, the direction perpendicular to the plane of the circuit board 31 is a Z-axis direction.

The lower surface of the ferrite 24 is placed on the ground pattern 28_4 of the circuit board 31. The shape of the ferrite 24 is substantially a cylindrical column. The direction of the central axis of the cylindrical column coincides with the Z-axis direction. Note that the shape of the ferrite 24 is not limited to a cylindrical column, and it may be a regular polygonal column. The ferrite 24 is made of a material such as YIG (Yttrium iron garnet), barium ferrite, strontium ferrite or the like. Further, in the circulator 2, instead of the ferrite 24, another ferromagnetic material may be used instead. In general, the ferrite 24 is a high dielectric constant dielectric material with a dielectric constant of more than 10. Therefore, a high-frequency electric field is concentrated on the inside of the ferrite 24, not on the air space above the upper surface of the ferrite 24. It is thereby possible to suppress the emission of electromagnetic waves from the upper surface of the ferrite 24.

The conductor cover 33 includes a circular main unit 22 located above the upper surface of the ferrite 24 and connecting members 37_1, 37_2 and 37_3 for electrically connecting the main unit 22 with each of the transmission lines 28_1, 28_2 and 28_3. The main unit 22 and the connecting members 37_1, 37_2 and 37_3 are integrally formed. Note that the shape of the main unit 22 is not limited to a circle, and it may be, for example, a regular polygon. The conductor cover 33 is made of a metal material such as brass or phosphor bronze, and it is preferably coated with silver (Ag) plating or the like. The conductor cover 33 may be made of a conductive material other than metal. Note that the details of the connecting members 37_1, 37_2 and 37_3 are described later.

The permanent magnet 25 is placed on the lower surface of the circuit board 31 so that it is opposite to the ferrite 24 with the circuit board 31 interposed therebetween. The position where the permanent magnet 25 is placed is not limited to the lower surface of the circuit board 31, and it may be placed, for example, on the upper surface of the circuit board 31. By the action of the permanent magnet 25, a direct-current magnetic field H from the upper side to the lower side or from the lower side to the upper side (see FIG. 5) is generated inside the ferrite 24.

The operation of the circulator 2 is described hereinafter with reference to FIGS. 3, 4 and 5.

When a high-frequency signal is input from a feeding point to the main unit 22 through the transmission line 28_1 and the connecting member 37_1, a high-frequency electromagnetic field is generated between the main unit 22 and the circuit board 31 (i.e., inside the ferrite 24) because of the high-frequency signal. To be specific, an electric field is generated in the direction perpendicular to the plane of the circuit board 31 (in the height direction of the ferrite 24), and a magnetic field is generated in the direction parallel to the plane of the circuit board 31. As described above, the direct-current magnetic field H from the upper side to the lower side or from the lower side to the upper side is applied to the inside of the ferrite 24 by the permanent magnet 25. The direction of the direct-current magnetic field H is perpendicular to the magnetic field that is generated inside the ferrite 24 by the high-frequency signal. When the direct-current magnetic field acts on the magnetic field that is generated inside the ferrite 24 by the high-frequency signal, the gyromagnetic effect emerges inside the ferrite 24, and the polarization plane of the propagating high-frequency signal rotates (Faraday rotation).

In the case where the direct-current magnetic field is applied from the lower side to the upper side, the high-frequency signal that is input from a feeding point to the main unit 22 through the transmission line 28_1 and the connecting member 37_1 rotates at that point, and it is output to the transmission line 28_2 through the connecting member 37_2. Further, the high-frequency signal that is input from the feeding point to the main unit 22 through the transmission line 28_2 and the connecting member 37_2 rotates at that point, and it is output to the transmission line 28_3 through the connecting member 37_3. Likewise, the high-frequency signal that is input from the feeding point to the main unit 22 through the transmission line 28_3 and the connecting member 37_3 rotates at that point, and it is output to the transmission line 28_1 through the connecting member 37_1. In this manner, the high-frequency signal is output only in one direction. The non-reciprocal operation of the circulator 2 is thereby implemented.

The structure of the connecting members 37_1, 37_2 and 37_3, which are the characterizing parts of the present invention, is described hereinafter.

The connecting members 37_1, 37_2 and 37_3 have base parts 30_1, 30_2 and 30_3, end parts 31_1, 31_2 and 31_3, and intermediate parts 32_1, 32_2 and 32_3, respectively. The base parts 30_1, 30_2 and 30_3 extend radially from the outer edge of the main unit 22 on the same plane as the main unit 22. The end parts 31_1, 31_2 and 31_3 lie on the same plane as the circuit board 31 and are electrically connected to the transmission lines 28_1, 28_2 and 28_3, respectively, on the circuit board 31 by soldering or the like. The intermediate parts 32_1, 32_2 and 32_3 connect between the base parts 30_1, 30_2 and 30_3 and the end parts 31_1, 31_2 and 31_3, respectively, and are opposite to the side surface of the ferrite 24.

The angle between the base part 30_1 and the base part 30_2, the angle between the base part 30_2 and the base part 30_3, and the angle between the base part 30_3 and the base part 30_1 are set to be the same as the angle between the direction of the transmission line 28_1 and the direction of the transmission line 28_2, the angle between the direction of the transmission line 28_2 and the direction of the transmission line 28_3 and the angle between the direction of the transmission line 28_3 and the direction of the transmission line 28_1, respectively. The connecting member 37_1 is bent at the boundary between the base part 30_1 and the intermediate part 32_1 and at the boundary between the intermediate part 32_1 and the end part 31_1. Further, the connecting member 37_2 is bent at the boundary between the base part 30_2 and the intermediate part 32_2 and at the boundary between the intermediate part 32_2 and the end part 31_2. Likewise, the connecting member 37_3 is bent at the boundary between the base part 30_3 and the intermediate part 32_3 and at the boundary between the intermediate part 32_3 and the end part 31_3.

Each of the intermediate parts 32_1, 32_2 and 32_3 has two bent points and is formed in a crank shape. Specifically, the intermediate parts 32_1, 32_2 and 32_3 first extend from the base parts 30_1, 30_2 and 30_3 in the direction perpendicular to the circuit board 31 (Z-axis direction), then bent in the direction parallel to the place of the circuit board 31 (XY plane), and further bent in the direction perpendicular to the circuit board 31 (Z-axis direction). In this structure, a clearance Ln between the side surface of the ferrite 24 and the intermediate parts 32_1, 32_2 and 32_3 in the upper part of the ferrite 24 is relatively small, and a clearance Lw between the side surface of the ferrite 24 and the intermediate parts 32_1, 32_2 and 32_3 in the lower part of the ferrite 24 is relatively large. In the intermediate parts 32_1, 32_2 and 32_3, the ratio of the height of the upper part (the part opposite to the upper side surface of the ferrite 24) to the lower part (the part opposite to the lower side surface of the ferrite 24) is preferably 1:1.

An evaluation test that was conducted to verify the effects of the present invention is described hereinbelow.

In the evaluation test, for each of the circulator 2 according to the first exemplary embodiment of the present invention, a circulator 18 according to a comparative example 1 and a circulator 19 according to a comparative example 2, return loss was measured under each of two conditions: with mounting displacement on the XY plane and without mounting displacement on the XY plane. Note that the return loss is the ratio of incident wave and reflected wave represented in dB. Further, the details of the conditions with mounting displacement and without mounting displacement are described later.

Figure 6A:
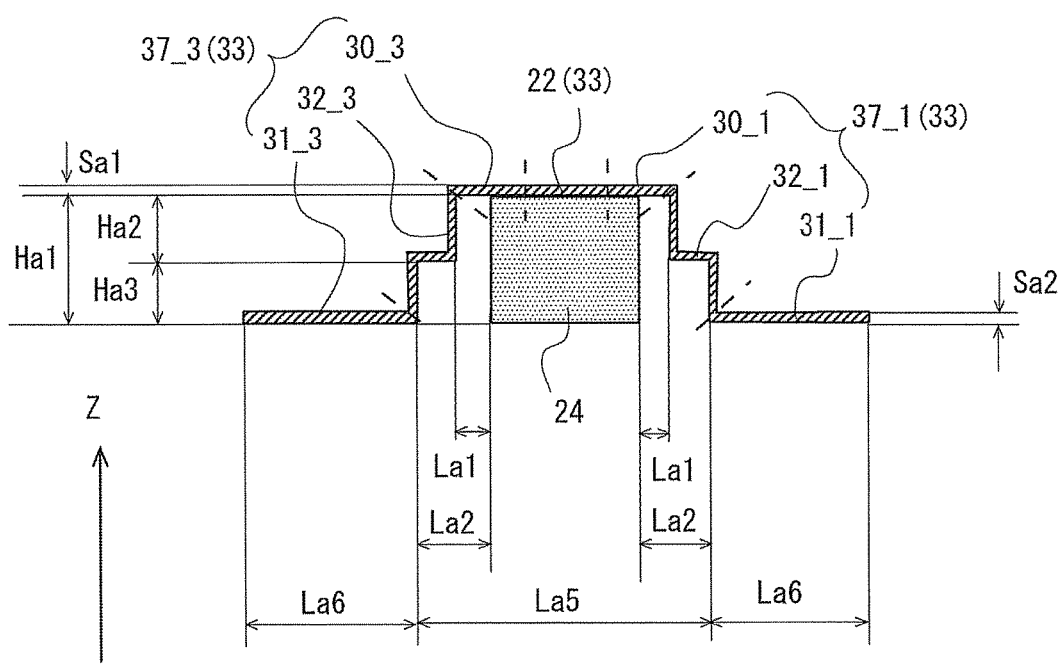
FIG. 6A is a view showing the positional relationship between a conductor cover and ferrite and various measurements in the circulator according to the first exemplary embodiment.
Figure 6B:
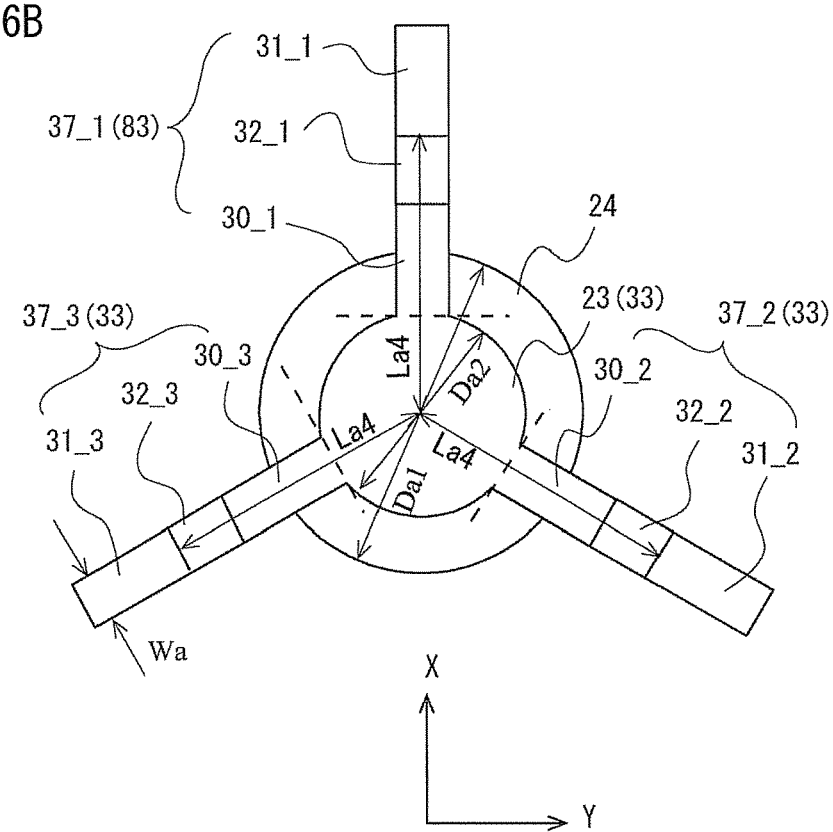
FIG. 6B is a view showing the positional relationship between a conductor cover and ferrite and various measurements in the circulator according to the first exemplary embodiment.

In the evaluation test, various measurements in the circulators were determined, assuming application to a 18 GHz radio frequency band (passband: 17.7 to 19.7 GHz). FIG. 6 is a view showing the positional relationship between the conductor cover 33 and the ferrite 24 and various measurements in the circulator 2 according to the first exemplary embodiment. FIG. 6A is a view that extracts only the conductor cover 33 and the ferrite 24 from the sectional view shown in FIG. 5. FIG. 6B is a view that extracts only the conductor cover 33 and the ferrite 24 from the plan view shown in FIG. 4.

As shown in FIGS. 6A and 6B, the ferrite 24 is a cylindrical column with a diameter Da1 of 5.15 mm and a height Ha1 (length in the Z direction) of 1.0 mm. The main unit 22 is a circular plate with a diameter Da2 of 1.7 mm and a thickness Sa1 of 0.5 mm. The connecting members 37_1, 37_2 and 37_3 have a thickness Sa2 of 0.5 mm and a width Wa of 0.5 mm. A clearance La1 between the side surface of the ferrite 24 and each of the intermediate parts 32_1, 32_2 and 32_3 in the upper part of the ferrite 24 is 0.1 mm. A clearance La2 between the side surface of the ferrite 24 and each of the intermediate parts 32_1, 32_2 and 32_3 in the upper part of the ferrite 24 is 0.2 mm. In each of the intermediate parts 32_1, 32_2 and 32_3, a height Ha2 of the upper part (the part opposite to the upper part of the ferrite 24) is 0.5 mm, and a height Ha3 of the lower part (the part opposite to the lower part of the ferrite 24) is 0.5 mm. Thus, the ratio of the height Ha2 of the upper part and the height Ha3 of the lower part in the intermediate parts 32_1, 32_2 and 32_3 is 1:1.

Each of the distance from the central axis of the ferrite 24 to the boundary between the intermediate part 32_1 and the end part 31_1 of the connecting member 37_1, the distance from the central axis of the ferrite 24 to the boundary between the intermediate part 32_2 and the end part 31_2 of the connecting member 37_2, and the distance from the central axis of the ferrite 24 to the boundary between the intermediate part 32_3 and the end part 31_3 of the connecting member 37_3 is La4=2.775 mm. A sum La5 of the distance from the central axis of the ferrite 24 to the boundary between the intermediate part 32_1 and the end part 31_1 of the connecting member 37_1 and the distance from the central axis of the ferrite 24 to the boundary between the intermediate part 32_3 and the end part 31_3 of the connecting member 37_3 is 5.55 mm (La4=La5/2=2.775 mm). A length La6 of each of the end parts 31_1, 31_2 and 31_3 is 1.9 mm.

Figure 7A:
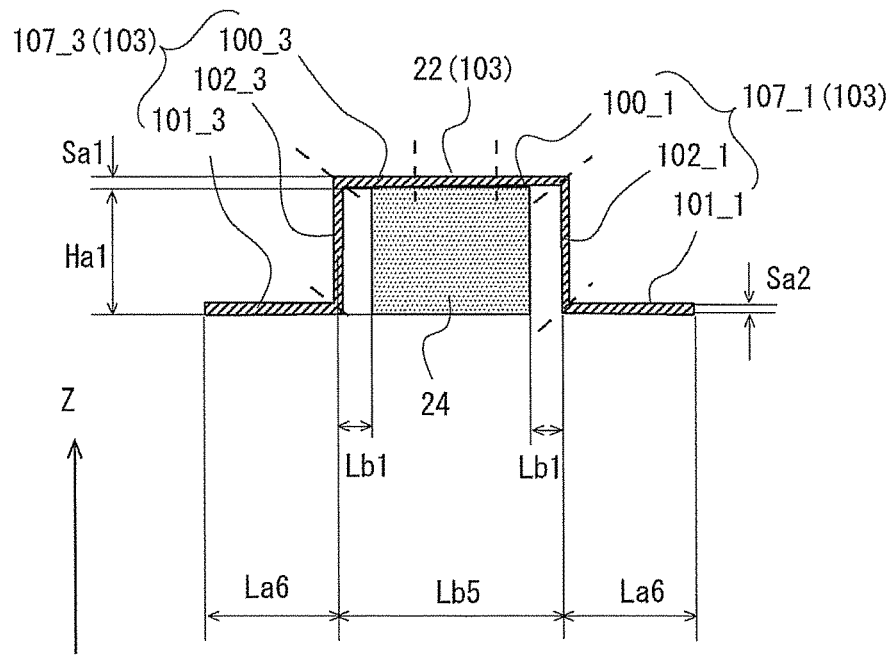
FIG. 7A is a view showing the positional relationship between a conductor cover and ferrite and various measurements in a circulator according to a comparative example 1.
Figure 7B:
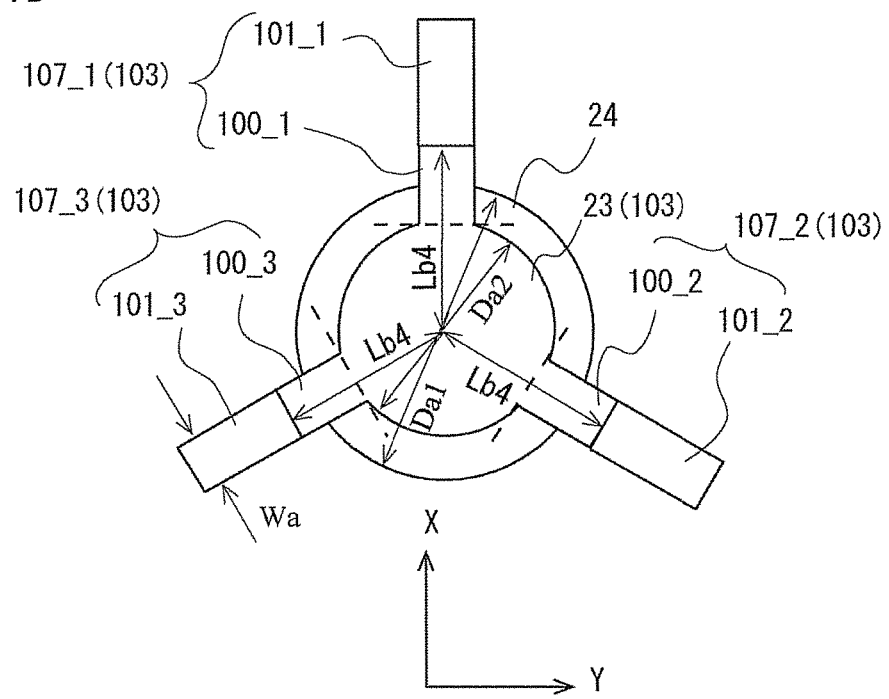
FIG. 7B is a view showing the positional relationship between a conductor cover and ferrite and various measurements in the circulator according to the comparative example 1.
Figure 8A:
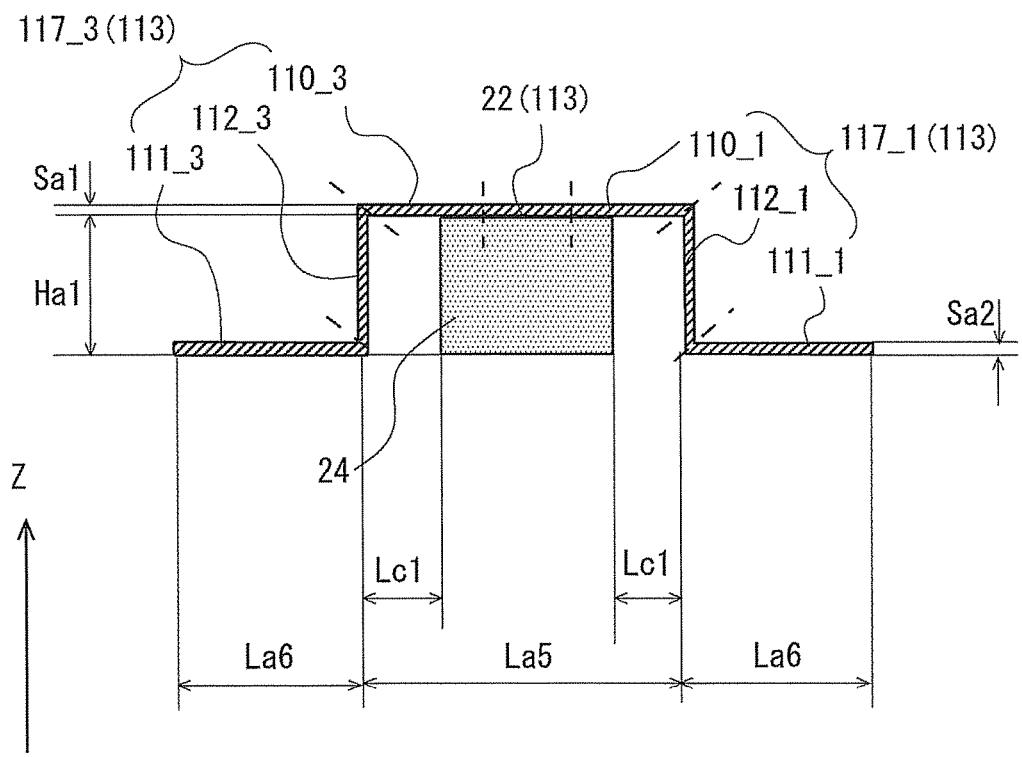
FIG. 8A is a view showing the positional relationship between a conductor cover and ferrite and various measurements in a circulator according to a comparative example 2.
Figure 8B:
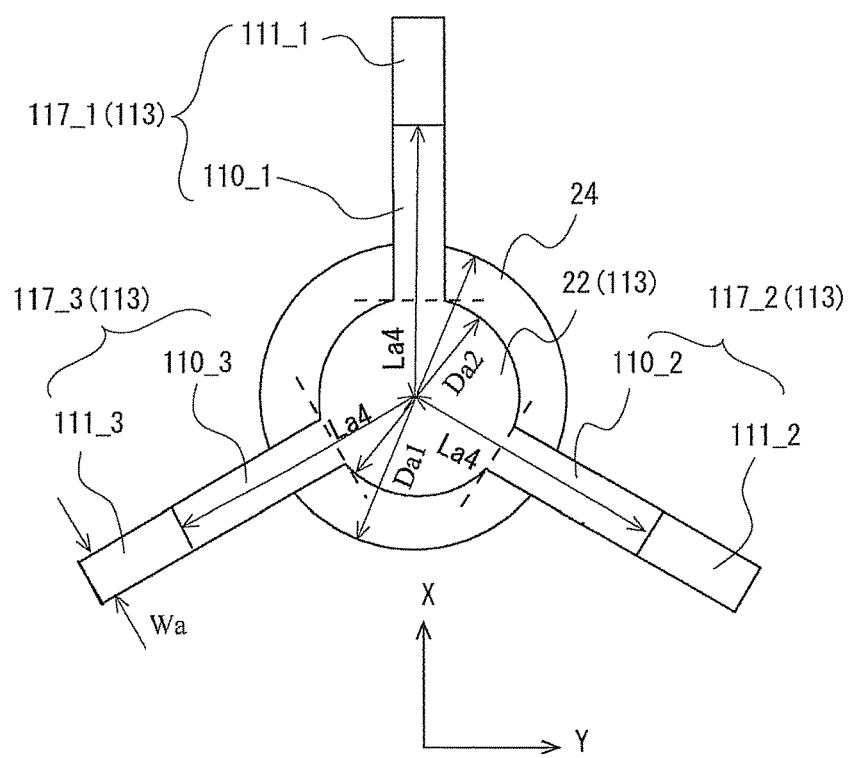
FIG. 8B is a view showing the positional relationship between a conductor cover and ferrite and various measurements in the circulator according to the comparative example 2.

FIGS. 7A and 7B are views showing the positional relationship between the conductor cover 33 and the ferrite 24 and various measurements in the circulator 18 according to the comparative example 1. FIG. 7A corresponds to FIG. 6A, and FIG. 7B corresponds to FIG. 6B. Further, FIGS. 8A and 8B are views showing the positional relationship between the conductor cover 33 and the ferrite 24 and various measurements in the circulator 19 according to the comparative example 2. FIG. 8A corresponds to FIG. 6A, and FIG. 8B corresponds to FIG. 6B. As shown in FIGS. 7A and 7B and FIGS. 8A and 8B, the circulator 18 according to the comparative example 1 and the circulator 19 according to the comparative example 2 are different from the circulator 2 according to this exemplary embodiment only in the shape of the conductor cover. To be specific, the circulator 18 according to the comparative example 1 and the circulator 19 according to the comparative example 2 do not have bent points in intermediate parts of connecting members, which are components of the conductor cover. Note that, in FIGS. 7A and 7B and FIGS. 8A and 8B, the measurement parts common to those in FIGS. 6A and 6B are denoted by the same reference symbols and the description thereof is omitted.

As shown in FIGS. 7A and 7B, the clearance between the ferrite 24 and the intermediate parts 102_1, 102_2 and 102_3 is substantially equal in the Z direction, which is 0.1 mm. This is equal to the clearance La1 between the side surface of the ferrite 24 and each of the intermediate parts 32_1, 32_2 and 32_3 in the upper part of the ferrite 24 (the smaller clearance) in the circulator 2 according to this exemplary embodiment. Each of the distance from the central axis of the ferrite 24 to the boundary between the intermediate part 102_1 and an end part 101_1 of the connecting member 107_1, the distance from the central axis of the ferrite 24 to the boundary between the intermediate part 102_2 and an end part 101_2 of the connecting member 107_2, and the distance from the central axis of the ferrite 24 to the boundary between the intermediate part 102_3 and an end part 101_3 of the connecting member 107_3 is La4=2.675 mm. A sum La5 of the distance from the central axis of the ferrite 24 to the boundary between the intermediate part 102_1 and the end part 101_1 of the connecting member 107_1 and the distance from the central axis of the ferrite 24 to the boundary between the intermediate part 102_3 and the end part 101_3 of the connecting member 107_3 is 5.35 mm (La4=La5/2=2.675 mm).

As shown in FIGS. 8A and 8B, the clearance between the ferrite 24 and the intermediate parts 112_1, 112_2 and 112_3 is substantially equal in the Z direction, which is 0.2 mm. This is equal to the clearance La2 between the side surface of the ferrite 24 and each of the intermediate parts 32_1, 32_2 and 32_3 in the lower part of the ferrite 24 (the larger clearance) in the circulator 2 according to this exemplary embodiment.

In this evaluation test, under the condition with mounting displacement on the XY plane, the central axis of the main unit of the conductor cover is displaced from the central axis of the ferrite by 0.1 mm in the positive side of the X axis direction. Under the condition without mounting displacement on the XY plane, on the other hand, the central axis of the main unit of the conductor cover substantially is disposed to substantially coincide with the central axis of the ferrite.

Figure 9:
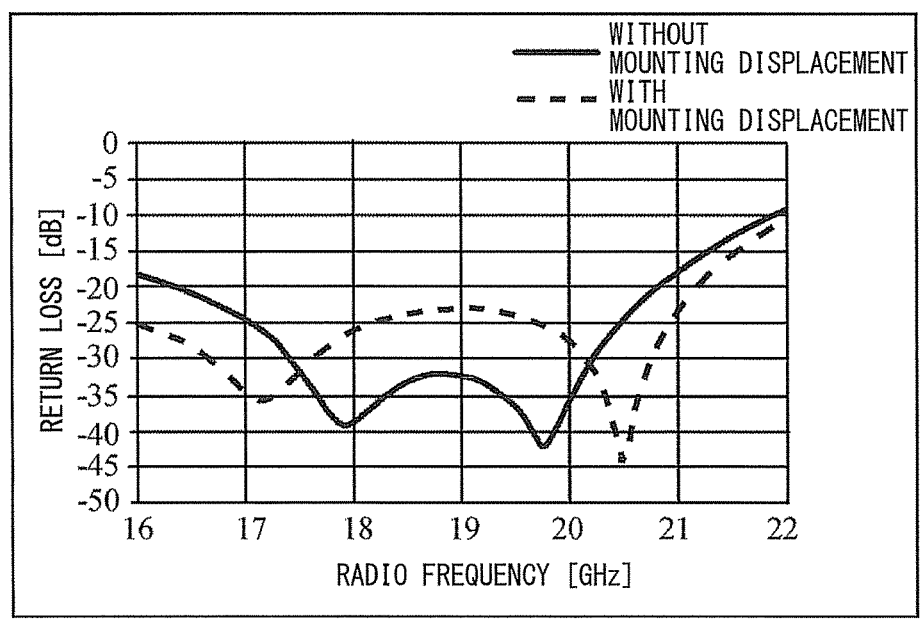
FIG. 9 is a view showing the relationship between a radio frequency and return loss of the circulator according to the first exemplary embodiment.
Figure 10:
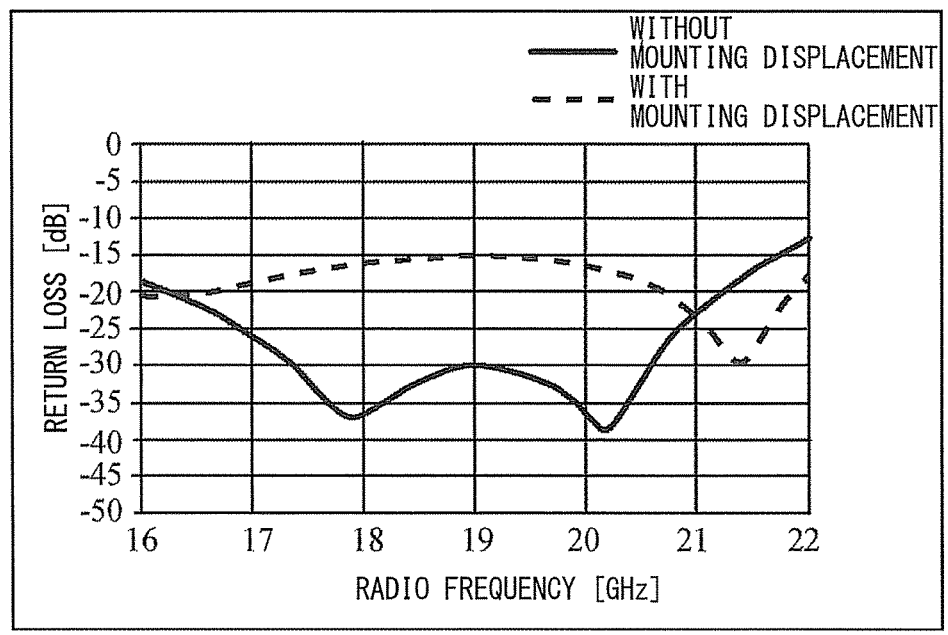
FIG. 10 is a view showing the relationship between a radio frequency and return loss of the circulator according to the comparative example 1.
Figure 11:
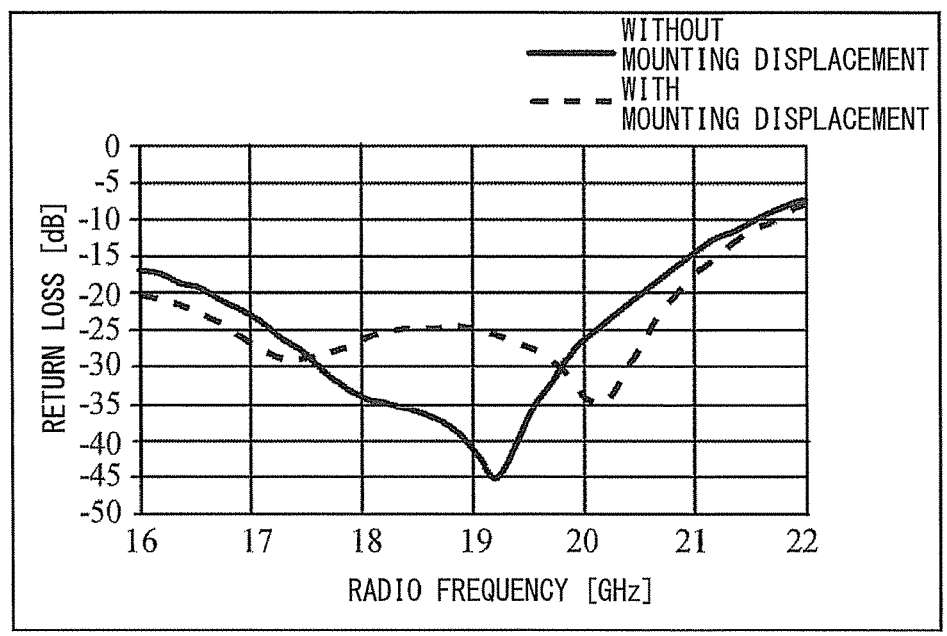
FIG. 11 is a view showing the relationship between a radio frequency and return loss of the circulator according to the comparative example 2.

FIG. 9 is a graph showing a result of the evaluation test for the circulator 2 according to this exemplary embodiment. FIG. 10 is a graph showing a result of the evaluation test for the circulator 18 according to the comparative example 1. FIG. 11 is a graph showing a result of the evaluation test for the circulator 19 according to the comparative example 2. In consideration of variations in production of the ferrite 24, the main unit 22 and the like, multilevel modulation scheme (e.g., 4096QAM), the necessity of broadband compatibility and the like, the absolute value of return loss at a radio frequency of 18 GHz needs to be at least 20 dB.

As shown in FIG. 9, in the circulator 2 according to this exemplary embodiment, the absolute value of return loss is sufficiently large over a wide band under the condition without mounting displacement. Further, under the condition with mounting displacement, the absolute value of return loss at a radio frequency of 18 GHz is 24 dB, which attains the target value 20 dB. Thus, it was verified that, in the circulator 2 according to this exemplary embodiment, it is possible to achieve broadband characteristics and reduce the degradation of return loss due to assembly errors (displacement of the conductor cover with respect to the ferrite on the XY plane).

As shown in FIG. 10, in the circulator 18 according to the comparative example 1, the absolute value of return loss is sufficiently large over a wide band under the condition without mounting displacement. However, under the condition with mounting displacement, the absolute value of return loss at a radio frequency of 18 GHz is about 15 dB (about 3% of input power is reflected), which is significantly lower than the target value 20 dB. Thus, it was verified that, in the circulator 18 according to the comparative example 1 where the gap between the side surface of the ferrite and the connecting members of the conductive cover is uniformly narrowed to 0.1 mm, while broadband characteristics are achieved, return loss due to assembly errors (displacement of the conductor cover with respect to the ferrite on the XY plane) is degraded.

In order to increase the absolute value of return loss to 20 dB or higher in the circulator 18 according to the comparative example 1, it is necessary to accurately set the position of the conductor cover 103 with respect to the ferrite 24 on the XY plane in order to prevent the displacement of the conductor cover 103 with respect to the ferrite 24 on the XY plane. However, it is extremely difficult to accurately set the position of the conductor cover with respect to the ferrite in the SMT circulator. Even if this can be done, an exceedingly expensive device for mounting is needed or an extra number of steps for mounting are required to cause a significant increase in manufacturing cost, which is impractical.

As shown in FIG. 11, the absolute value of return loss at a radio frequency of 18 GHz is 25 dB under the condition with mounting displacement, which attains the target value 20 dB. However, under the condition without mounting displacement, the band where the absolute value of return loss is sufficiently large is narrow, and broadband characteristics are not achieved. Thus, it was verified that, in the circulator 18 according to the comparative example 1 where the gap between the side surface of the ferrite and the connecting members of the conductive cover is uniformly widened to 0.2 mm, while the degradation of return loss due to assembly errors (displacement of the conductor cover with respect to the ferrite on the XY plane) is reduced, broadband characteristics are not achieved.

As described above, according to the exemplary embodiment of the present invention, it is possible to achieve broadband characteristics and reduce the degradation of return loss due to assembly errors (displacement of a conductor cover with respect to ferrite on an XY plane) at the time of mounting. Further, according to the exemplary embodiment of the present invention, it is possible to reduce the number of steps for mounting because there is no need for accurate positioning of the ferrite and the conductor cover.

The present inventors have made further studies by three-dimensional simulation or the like and, as a result, have found that it is possible to achieve broadband characteristics and reduce the degradation of return loss due to assembly errors (displacement of a conductor cover with respect to ferrite on an XY plane) at the time of mounting in any structure of the circulator as long as the clearance between the side surface of the ferrite and the intermediate part of the connecting member is smaller in one location than another in the gap between the side surface of the ferrite and the intermediate parts of the connecting members, not limited to the structure described in this exemplary embodiment.

Second Exemplary Embodiment

A second exemplary embodiment of the present invention is described hereinafter with reference to the drawings. It should be noted that the elements common to those in the first exemplary embodiment are denoted by the same reference symbols and the description thereof is omitted.

Figure 12:
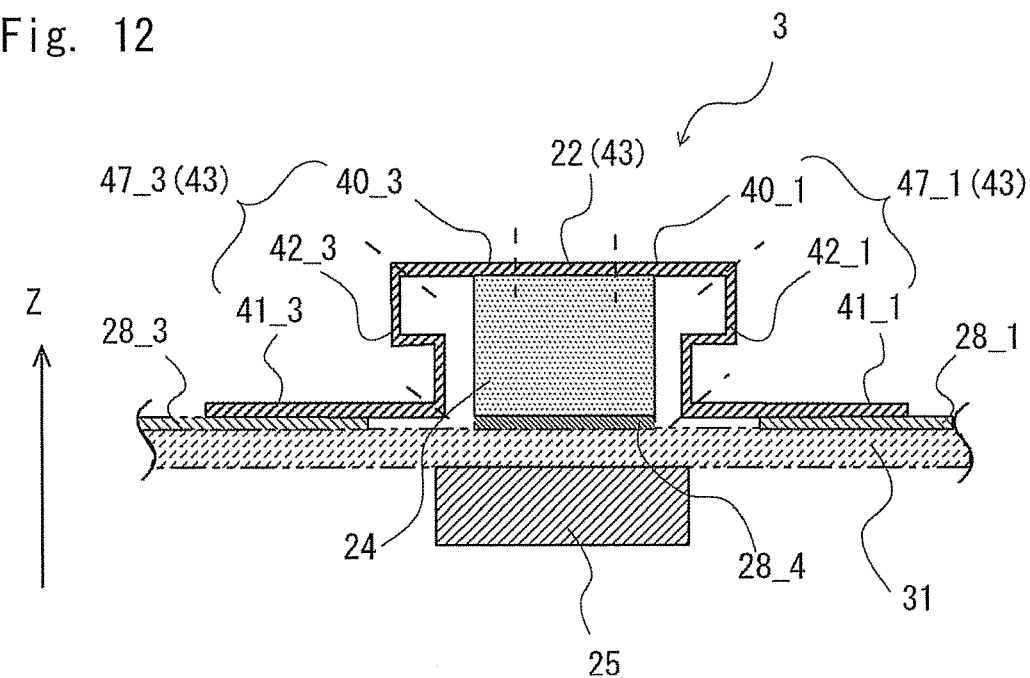
FIG. 12 is a view showing the schematic structure of a circulator according to a second exemplary embodiment.

FIG. 12 is a view showing the schematic structure of a circulator 3 according to this exemplary embodiment. FIG. 12 is a cross-sectional view corresponding to FIG. 5 in the first exemplary embodiment. As shown in FIG. 12, a difference from the circulator 2 according to the first exemplary embodiment is the shape of intermediate parts 42_1, 42_2 and 42_3 of connecting members 47_1, 47_2 and 47_3, respectively, which are components of a conductor cover 43.

The connecting members 47_1, 47_2 and 47_3, which are components of the conductor cover 43, are formed into a crank shape having two bent points in each of the intermediate parts 42_1, 42_2 and 42_3. The clearance between the side surface of the ferrite 24 and the intermediate parts 42_1, 42_2 and 42_3 is relatively large in the upper part of the ferrite 24 and is relatively small in the lower part of the ferrite 24. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting.

Third Exemplary Embodiment

A third exemplary embodiment of the present invention is described hereinafter with reference to the drawings. It should be noted that the elements common to those in the first exemplary embodiment are denoted by the same reference symbols and the description thereof is omitted.

Figure 13:
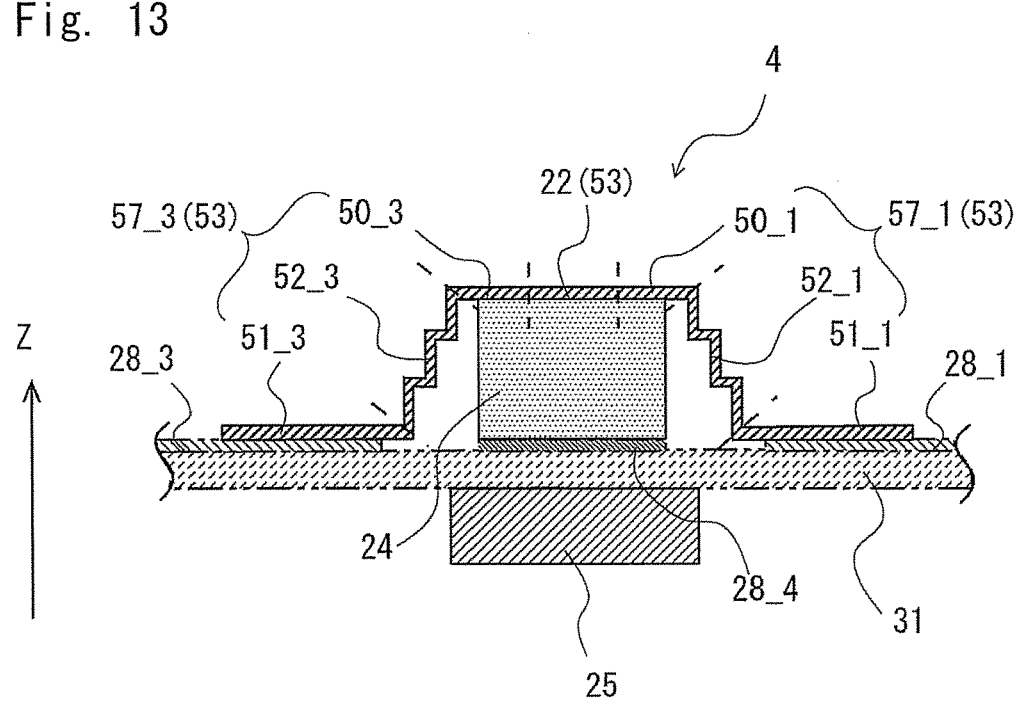
FIG. 13 is a view showing the schematic structure of a circulator according to a third exemplary embodiment.

FIG. 13 is a view showing the schematic structure of a circulator 4 according to this exemplary embodiment. FIG. 13 is a cross-sectional view corresponding to FIG. 5 in the first exemplary embodiment. As shown in FIG. 13, a difference from the circulator 2 according to the first exemplary embodiment is the shape of intermediate parts 52_1, 52_2 and 52_3 of connecting members 57_1, 57_2 and 57_3, respectively, which are components of a conductor cover 53.

The connecting members 57_1, 57_2 and 57_3, which are components of the conductor cover 53, are formed in a stepped shape having four bent points in each of the intermediate parts 52_1, 52_2 and 52_3. The clearance between the side surface of the ferrite 24 and the intermediate parts 52_1, 52_2 and 52_3 is larger in the middle part than in the upper part of the ferrite 24 and larger in the lower part than in the middle part of the ferrite 24. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting. Note that the number of bent points (2n: n is a natural number) in the intermediate parts 52_1, 52_2 and 52_3 may be increased to n≥3.

Fourth Exemplary Embodiment

A fourth exemplary embodiment of the present invention is described hereinafter with reference to the drawings. It should be noted that the elements common to those in the first exemplary embodiment are denoted by the same reference symbols and the description thereof is omitted.

Figure 14:
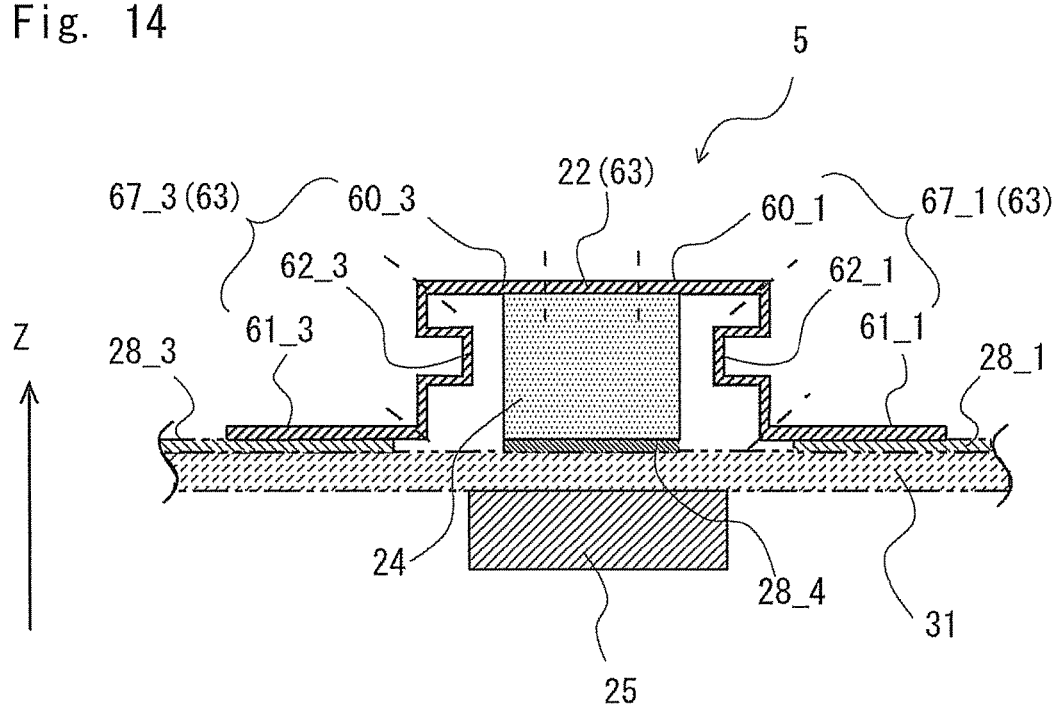
FIG. 14 is a view showing the schematic structure of a circulator according to a fourth exemplary embodiment.

FIG. 14 is a view showing the schematic structure of a circulator 5 according to this exemplary embodiment. FIG. 14 is a cross-sectional view corresponding to FIG. 5 in the first exemplary embodiment. As shown in FIG. 14, a difference from the circulator 2 according to the first exemplary embodiment is the shape of intermediate parts 62_1, 62_2 and 62_3 of connecting members 67_1, 67_2 and 67_3, respectively, which are components of a conductor cover 63.

The connecting members 67_1, 67_2 and 67_3, which are components of the conductor cover 63, have four bent points in each of the intermediate parts 62_1, 62_2 and 62_3. This is the same as the conductor cover 53 in the third exemplary embodiment. The clearance between the side surface of the ferrite 24 and the intermediate parts 62_1, 62_2 and 62_3 is larger in the upper part and the lower part than in the middle part of the ferrite 24. In this structure, the clearance between the side surface of the ferrite and the connecting members is relatively large in some locations and relatively small in another location, and it is thereby possible to achieve broadband characteristics and reduce the degradation of return loss due to assembly errors (displacement of a conductor cover with respect to ferrite on an XY plane) at the time of mounting.

Fifth Exemplary Embodiment

A fifth exemplary embodiment of the present invention is described hereinafter with reference to the drawings. It should be noted that the elements common to those in the first exemplary embodiment are denoted by the same reference symbols and the description thereof is omitted.

Figure 15:
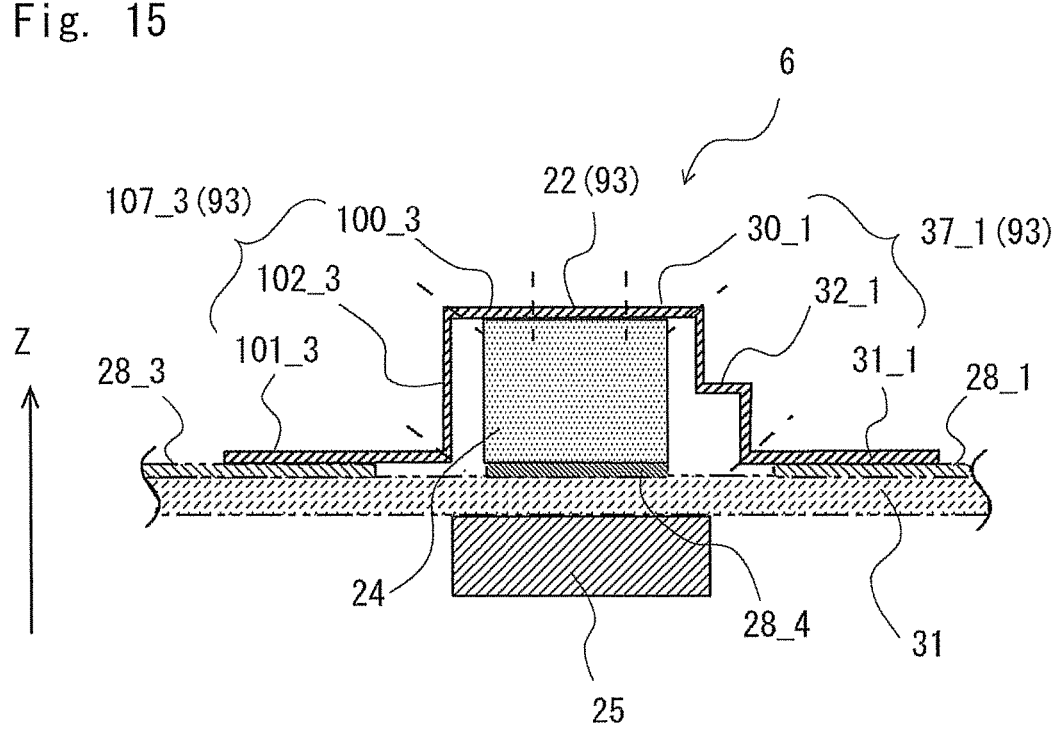
FIG. 15 is a view showing the schematic structure of a circulator according to a fifth exemplary embodiment.

FIG. 15 is a view showing the schematic structure of a circulator 6 according to this exemplary embodiment. FIG. 15 is a cross-sectional view corresponding to FIG. 5 in the first exemplary embodiment. As shown in FIG. 15, a difference from the circulator 2 according to the first exemplary embodiment is that the connecting member 107_3 described in the comparative example 1 of the first exemplary embodiment is used for one of connecting members of a conductor cover 93. For the other two connecting members, the connecting members 37_1 and 37_2 of the circulator 2 according to the first exemplary embodiment are used. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting.

Sixth Exemplary Embodiment

A sixth exemplary embodiment of the present invention is described hereinafter with reference to the drawings. It should be noted that the elements common to those in the first exemplary embodiment are denoted by the same reference symbols and the description thereof is omitted.

Figure 16:
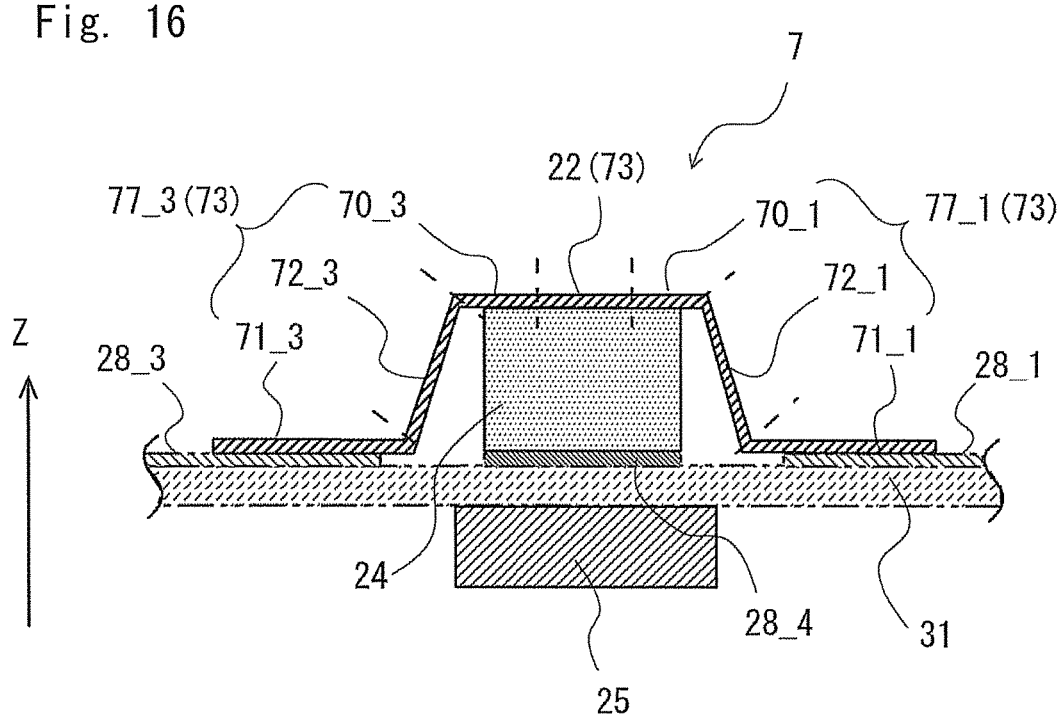
FIG. 16 is a view showing the schematic structure of a circulator according to a sixth exemplary embodiment.

FIG. 16 is a view showing the schematic structure of a circulator 7 according to this exemplary embodiment. FIG. 16 is a cross-sectional view corresponding to FIG. 5 in the first exemplary embodiment. As shown in FIG. 16, a difference from the circulator 2 according to the first exemplary embodiment is the shape of intermediate parts 72_1, 72_2 and 72_3 of connecting members 77_1, 77_2 and 77_3, respectively, which are components of a conductor cover 73.

The intermediate parts 72_1, 72_2 and 72_3 of the connecting members 77_1, 77_2 and 77_3, which are components of the conductor cover 73, do not have any bent points. The connecting members 77_1, 77_2 and 77_3 have the structure in which the gap between the side surface of the ferrite 24 and the intermediate parts 72_1, 72_2 and 72_3 is larger toward the circuit board 31. Specifically, the clearance between the side surface of the ferrite 24 and the intermediate parts 72_1, 72_2 and 72_3 becomes gradually larger from the upper part to the lower part of the ferrite 24. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting.

Seventh Exemplary Embodiment

A seventh exemplary embodiment of the present invention is described hereinafter with reference to the drawings. It should be noted that the elements common to those in the first exemplary embodiment are denoted by the same reference symbols and the description thereof is omitted.

Figure 17:
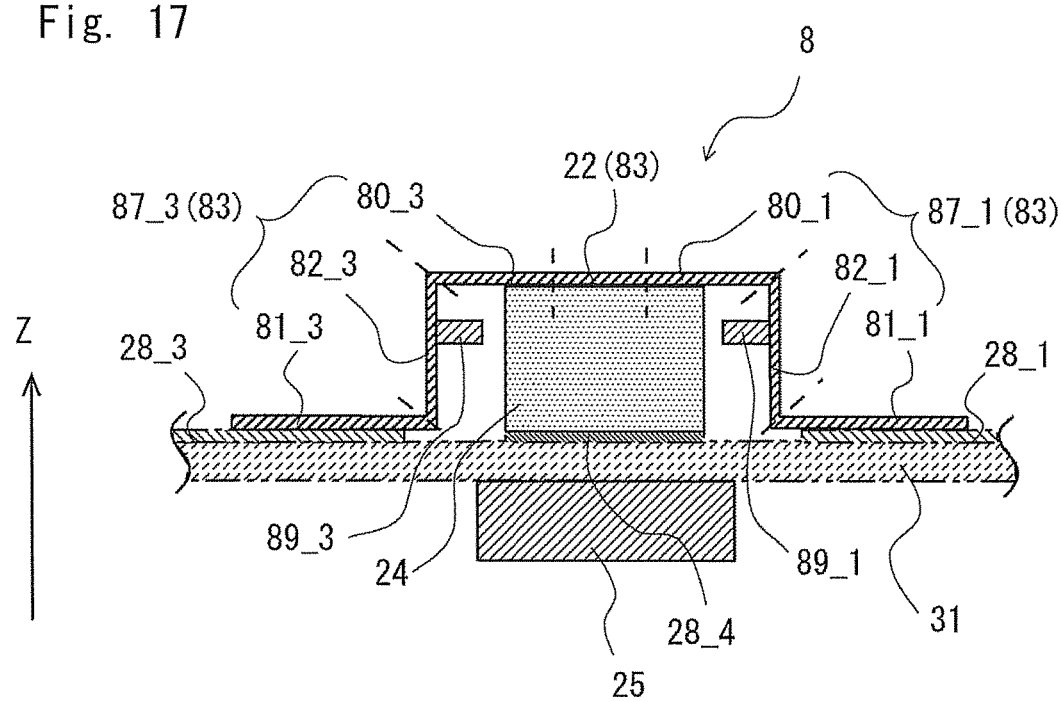
FIG. 17 is a view showing the schematic structure of a circulator according to a seventh exemplary embodiment.

FIG. 17 is a view showing the schematic structure of a circulator 8 according to this exemplary embodiment. FIG. 17 is a cross-sectional view corresponding to FIG. 5 in the first exemplary embodiment. As shown in FIG. 17, a difference from the circulator 2 according to the first exemplary embodiment is the shape of intermediate parts 82_1, 82_2 and 82_3 of connecting members 87_1, 87_2 and 87_3, respectively, which are components of a conductor cover 73.

The intermediate parts 82_1, 82_2 and 82_3 of the connecting members 87_1, 87_2 and 87_3, which are components of the conductor cover 73, do not have any bent points. The intermediate parts 82_1, 82_2 and 82_3 respectively have protrusions 89_1, 89_2 and 89_3 whose ends are close to the side surface of the ferrite 24. The positions to place the protrusions 89_1, 89_2 and 89_3 in the intermediate parts 82_1, 82_2 and 82_3 along the Z direction are not particularly limited. Thus, positions at which the ends of the protrusions 89_1, 89_2 and 89_3 are opposed to the ferrite 24 may be any of the upper position, the middle position and the lower position of the ferrite 24. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting.

Figure 18:
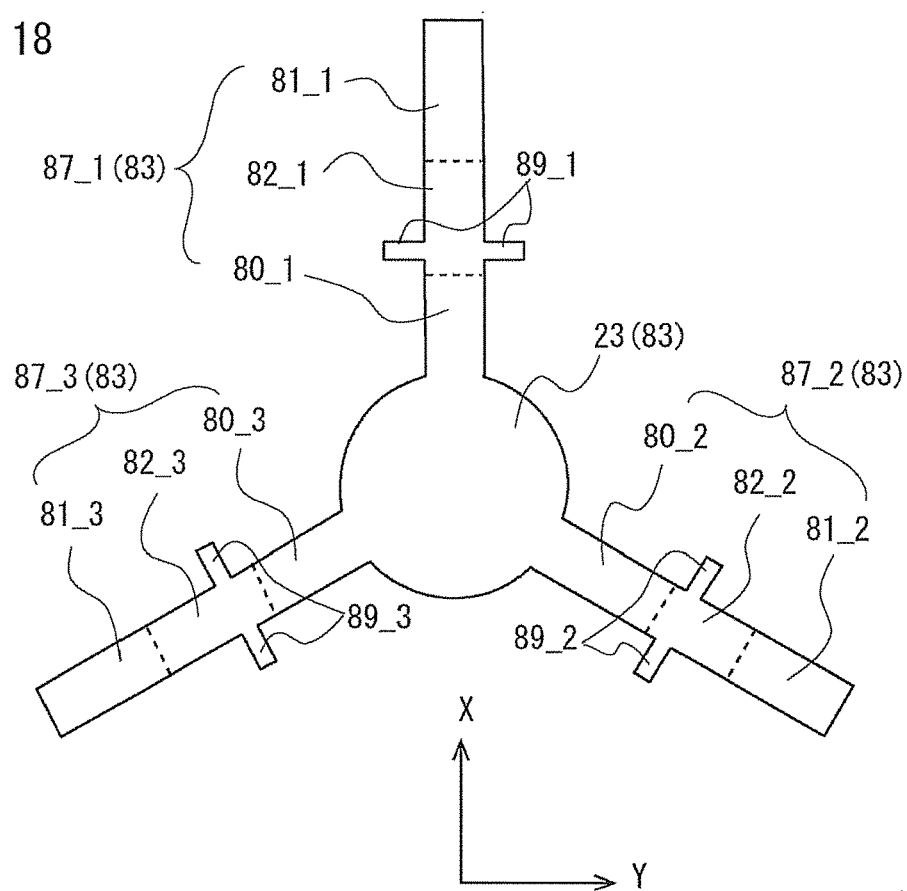
FIG. 18 is a view illustrating an example of a method of forming protrusions in connecting members.

FIG. 18 is a view illustrating an example of a method for forming the protrusions 89_1, 89_2 and 89_3 in the connecting members 87_1, 87_2 and 87_3. FIG. 18 shows the state before the connecting members 87_1, 87_2 and 87_3 are bent at the boundary between base parts 80_1, 80_2 and 80_3 and the intermediate parts 82_1, 82_2 and 82_3 and at the boundary between the intermediate parts 82_1, 82_2 and 82_3 and end parts 81_1, 81_2 and 81_3. As shown in FIG. 18, on both sides of the intermediate parts 82_1, 82_2 and 82_3, the blade-shaped protrusions 89_1, 89_2 and 89_3 are integrally formed with the connecting members 87_1, 87_2 and 87_3, respectively. Then, the blade-shaped protrusions 89_1, 89_2 and 89_3 are bent downward of the plane of paper. Note that the method for forming the protrusions 89_1, 89_2 and 89_3 is not limited thereto, and another method may be used.

Eighth Exemplary Embodiment

An eighth exemplary embodiment of the present invention is described hereinafter with reference to the drawings. It should be noted that the elements common to those in the first exemplary embodiment are denoted by the same reference symbols and the description thereof is omitted.

Figure 19:
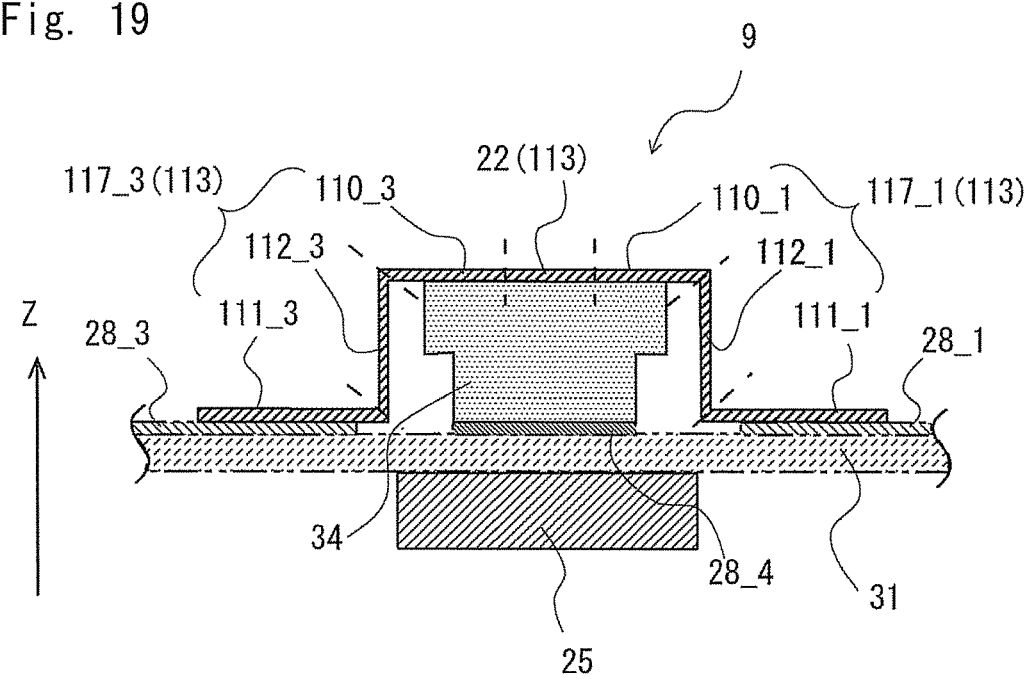
FIG. 19 is a view showing the schematic structure of a circulator according to an eighth exemplary embodiment.

FIG. 19 is a view showing the schematic structure of a circulator 9 according to this exemplary embodiment. FIG. 19 is a cross-sectional view corresponding to FIG. 5 in the first exemplary embodiment. As shown in FIG. 19, in this exemplary embodiment, a conductor cover 113 in the circulator 19 described with reference to FIG. 8 in the first exemplary embodiment is used as the conductor cover. Thus, the intermediate parts 112_1, 112_2 and 112_3 of the connecting members 117_1, 117_2 and 117_3, which are components of the conductor cover 113, do not have any bent points. The intermediate parts 112_1, 112_2 and 112_3 are substantially perpendicular to the plane of the circuit board 31.

The characterizing part in this exemplary embodiment is the shape of a ferrite 34. The ferrite 34 has a shape where two cylinders with different diameters are coaxially placed on top of each other in the direction perpendicular to the circuit board 31. In the ferrite 34, the diameter of the cylinder placed at the top is larger than the diameter of the cylinder placed at the bottom.

In this structure, the clearance between the side surface of the cylinder placed in the upper part of the ferrite 34 and the intermediate parts 112_1, 112_2 and 112_3 is smaller than the clearance between the side surface of the cylinder placed at the lower part of the ferrite 34 and the intermediate parts 112_1, 112_2 and 112_3. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting. Note that the number of cylinders in the ferrite 34 is not limited to two, and it may be two or more.

Ninth Exemplary Embodiment

A ninth exemplary embodiment of the present invention is described hereinafter with reference to the drawings. It should be noted that the elements common to those in the first exemplary embodiment are denoted by the same reference symbols and the description thereof is omitted.

Figure 20:
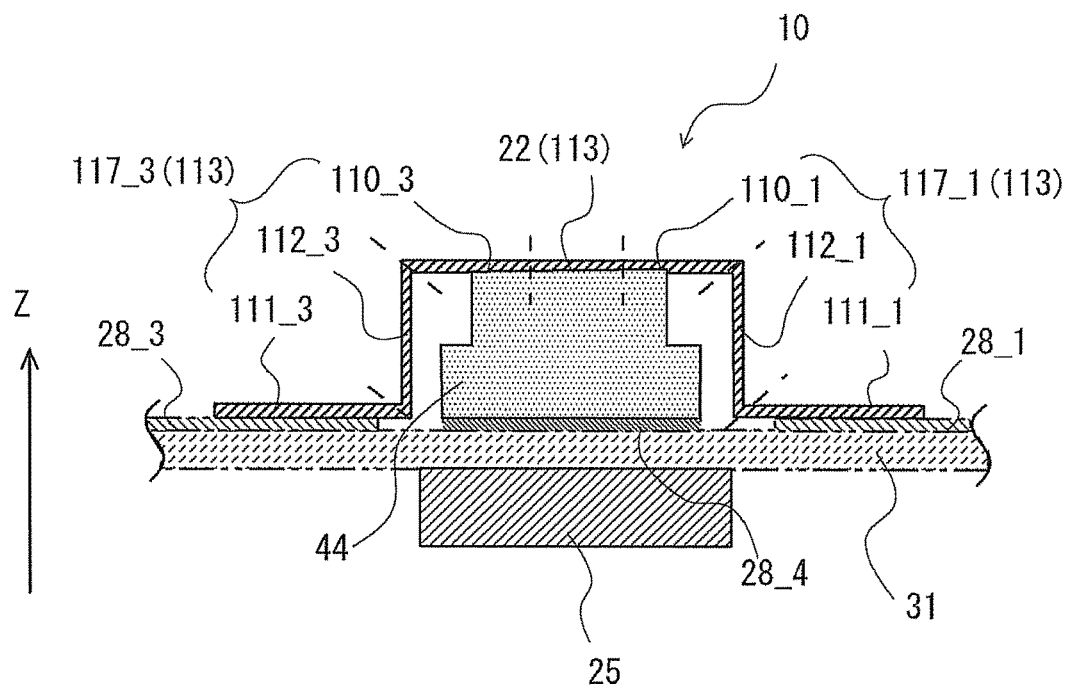
FIG. 20 is a view showing the schematic structure of a circulator according to a ninth exemplary embodiment.

FIG. 20 is a view showing the schematic structure of a circulator 10 according to this exemplary embodiment. FIG. 20 is a cross-sectional view corresponding to FIG. 5 in the first exemplary embodiment. This is different from the circulator 9 according to the eighth exemplary embodiment only in that the ferrite is placed upside down. Specifically, as shown in FIG. 20, in a ferrite 44, the diameter of the cylinder placed at the bottom is larger than the diameter of the cylinder placed at the top. In this structure, just like the circulator 9 according to the eighth exemplary embodiment, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting. Note that the number of cylinders in the ferrite 34 is not limited to two, and it may be two or more.

Tenth Exemplary Embodiment

A tenth exemplary embodiment of the present invention is described hereinafter with reference to the drawings. It should be noted that the elements common to those in the first exemplary embodiment are denoted by the same reference symbols and the description thereof is omitted.

Figure 21:
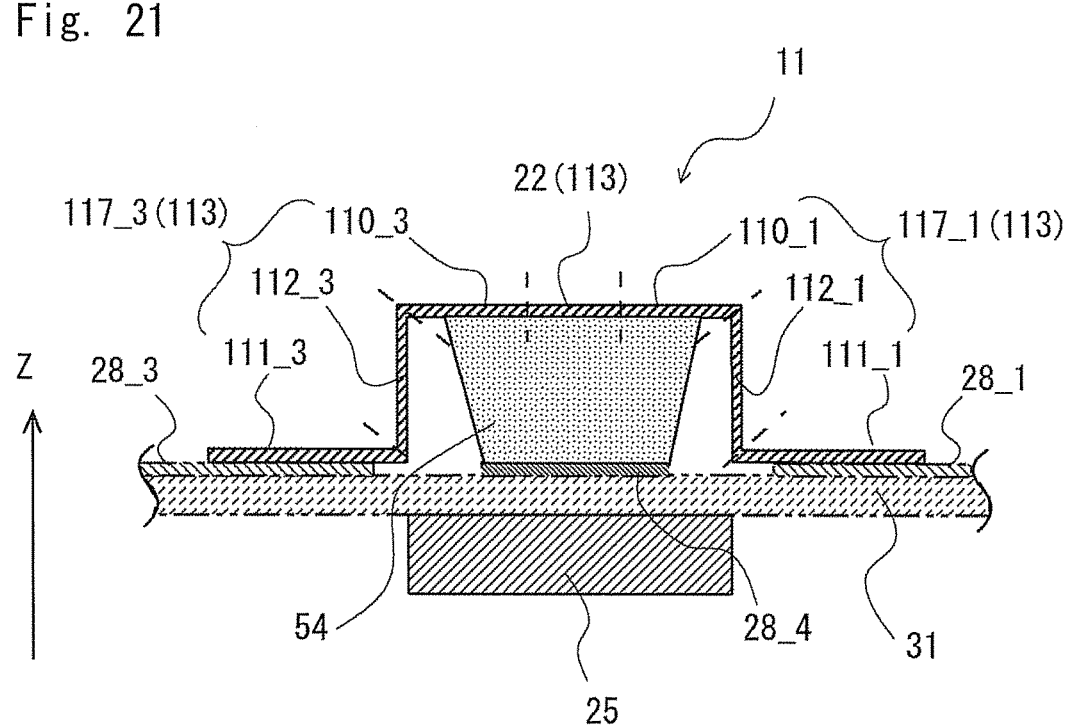
FIG. 21 is a view showing the schematic structure of a circulator according to a tenth exemplary embodiment.

FIG. 21 is a view showing the schematic structure of a circulator 11 according to this exemplary embodiment. FIG. 21 is a cross-sectional view corresponding to FIG. 5 in the first exemplary embodiment. In the circulator 9 according to the eighth exemplary embodiment, the cylinder with a larger diameter than the cylinder located at the bottom is placed on top of the cylinder located at the bottom in the ferrite 34, so that the clearance between the side surface of the upper part of the ferrite 34 and the intermediate parts 112_1, 112_2 and 112_3 is smaller than the clearance between the side surface of the lower part of the ferrite 34 and the intermediate parts 112_1, 112_2 and 112_3.

On the other hand, a ferrite 54 of the circulator 11 according to this exemplary embodiment is formed into a truncated cone shape that tapers from the upper surface to the lower surface as shown in FIG. 21. Specifically, the clearance between the side surface of the ferrite 54 and the intermediate parts 112_1, 112_2 and 112_3 becomes smaller from the upper part to the lower part of the ferrite 34. In this structure, the clearance between the side surface of the ferrite and the connecting members is relatively large in one location and relatively small in another location, and it is thereby possible to achieve broadband characteristics and reduce the degradation of return loss due to assembly errors (displacement of a conductor cover with respect to ferrite on an XY plane) at the time of mounting.

Eleventh Exemplary Embodiment

An eleventh exemplary embodiment of the present invention is described hereinafter with reference to the drawings. It should be noted that the elements common to those in the first exemplary embodiment are denoted by the same reference symbols and the description thereof is omitted.

Figure 22:
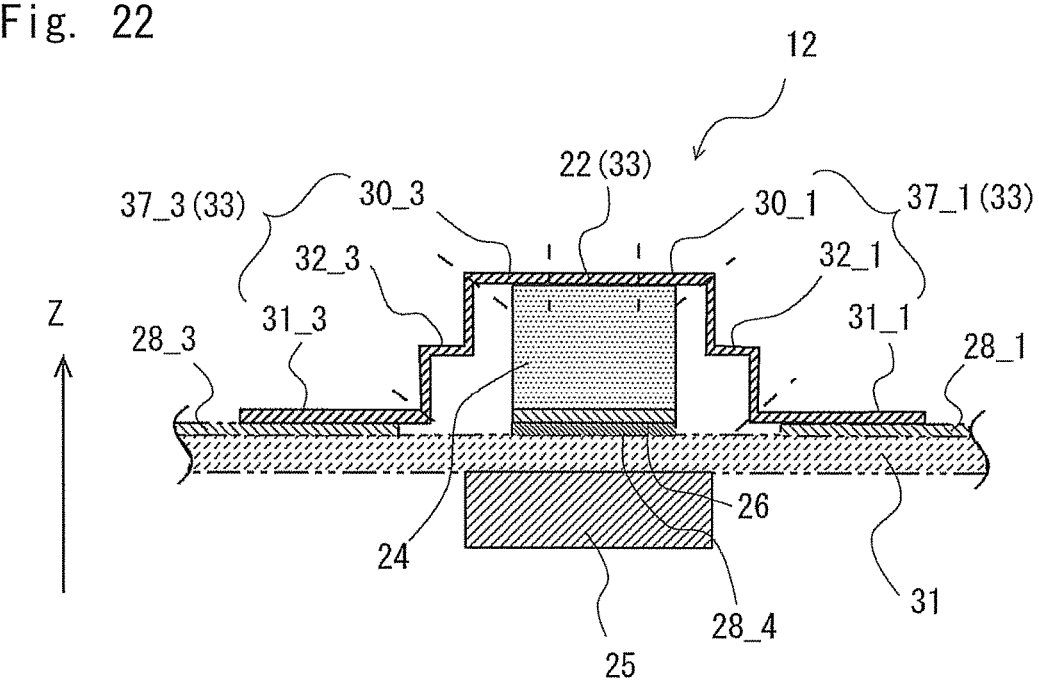
FIG. 22 is a view showing the schematic structure of a circulator according to an eleventh exemplary embodiment.

FIG. 22 is a view showing the schematic structure of a circulator 12 according to this exemplary embodiment. FIG. 22 is a cross-sectional view corresponding to FIG. 5 in the first exemplary embodiment. As shown in FIG. 22, a difference from the circulator 2 according to the first exemplary embodiment is that a silver thick film 26 is formed on the lower surface of the ferrite 24.

Figure 23:
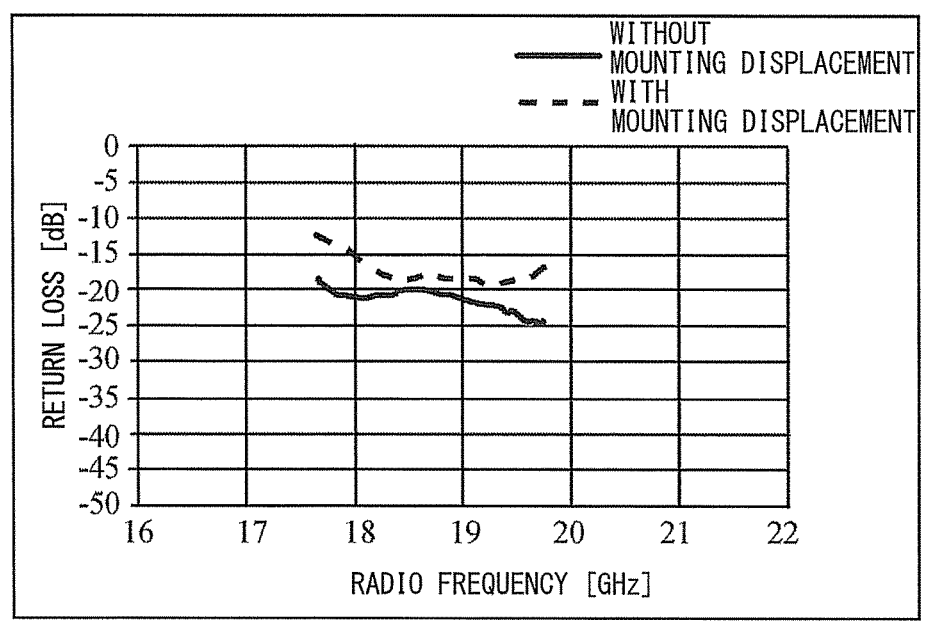
FIG. 23 is a view comparing return loss between a circulator where the lower surface of ferrite is spaced up above a circuit board surface (ferrite spaced from the surface) and a circulator where ferrite is pressed against a circuit board surface (ferrite not spaced from the surface).
Figure 24:
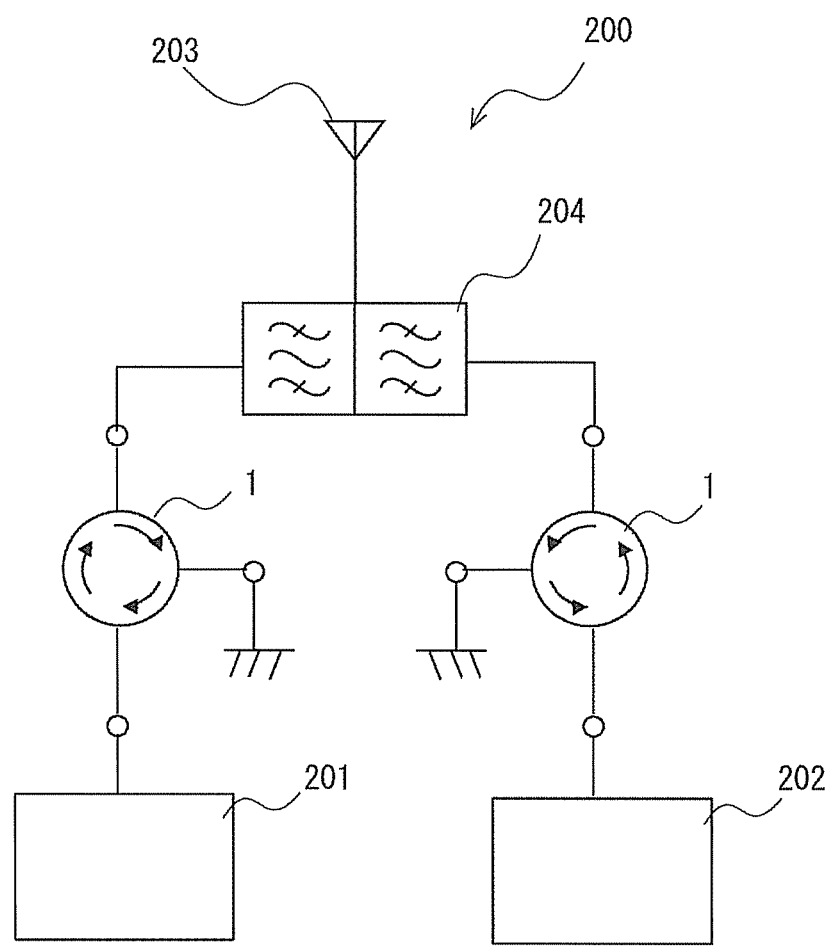
FIG. 24 is a view showing an example of the case where a non-reciprocal circuit element according to an exemplary embodiment of the present invention is applied to a wireless communication device.

In a circulator, if the lower surface of ferrite is spaced up above a circuit board surface due to warpage of the circuit board, mounting defects of a conductor cover and the like, there is a possibility that electrical connection between the ferrite and a ground pattern is insufficient and return loss is degraded. FIG. 23 is a view comparing return loss between a circulator where the lower surface of ferrite is spaced up above a circuit board surface (ferrite spaced from the surface) and a circulator where ferrite is pressed against a circuit board surface (ferrite not spaced from the surface). In the circulator where ferrite is spaced from the surface, return loss is degraded compared with the circulator where ferrite is not spaced from the surface.

It is possible to prevent the lower surface of ferrite from coming up above a circuit board surface by soldering the lower surface of the ferrite onto the ground pattern. However, it is not possible to solder the ferrite directly onto the circuit board surface. Therefore, as shown in FIG. 22, the silver thick film 26 having high compatibility with soldering is formed on the lower surface of the ferrite 24, and the lower surface of the ferrite 24 is soldered onto the ground pattern 28_4 of the circuit board 31. In this structure of the circulator 12, it is possible to further reduce the degradation of return loss. Further, by widening the clearance between the side surface of the ferrite 24 and the intermediate parts 32_1, 32_2 and 32_3 in the lower part of the ferrite 24, it is possible to reduce the possibility of occurrence of a solder bridge and short circuit between the end parts 31_1, 31_2 and 31_3 of the connecting members 37_1, 37_2 and 37_3 and the ferrite 24 when soldering the lower surface of the ferrite 24 onto the circuit board 31.

As a technique to form the silver thick film 26 on the lower surface of the ferrite 24, silver thick film printing technology may be used, for example. The silver thick film printing technology applies silver paste at a desired position with a desired shape and thickness by screen printing or the like, burns it at a high temperature and thereby forms a silver thick film. Note that a method for soldering the ferrite 24 onto the ground pattern 28_4 is not limited to the silver thick film printing technology, and another method may be used.

Note that, the case where a silver thick film is formed on the lower surface of the ferrite of the circulator according to the first exemplary embodiment, and the lower surface of the ferrite is soldered to the circuit board is described in this exemplary embodiment. A silver thick film may be formed on the lower surface of the ferrite of the circulators according to the second to tenth exemplary embodiments, and the lower surface of the ferrite may be soldered to the circuit board. In the case where the clearance between the side surface of the lower part of the ferrite and the intermediate parts of the connecting members is relatively large as in the third, fourth, sixth, seventh, eighth and tenth exemplary embodiments, it is possible to reduce the possibility of occurrence of a solder bridge and short circuit between the end parts of the connecting members and the ferrite when soldering the lower surface of the ferrite onto the circuit board.

The present invention can be applied also to an isolator where one end of an input/output part is terminated. In this case, the circulator may include at least two transmission lines.

FIG. 23 is a showing an example of the case where the non-reciprocal circuit element 1 according to the exemplary embodiment of the present invention is applied to a wireless communication device. As shown in FIG. 23, a wireless communication device 200 includes two non-reciprocal circuit elements 1, a transmitting circuit 201, a receiving circuit 202, an antenna 203, and a duplexer (branching filter) 204. The transmitting circuit 41 includes a power amplifier (PA), a gain amplifier including an attenuator, a modulator, a bandpass filter, a PLL synthesizer including a voltage-controlled oscillator (VCO) and the like. The receiving circuit 43 includes a low noise amplifier (LNA), a gain amplifier including an attenuator, a demodulator, a bandpass filter, a PLL synthesizer including a voltage-controlled oscillator (VCO) and the like. The two non-reciprocal circuit elements 1 are placed between the transmitting circuit 201 and the duplexer 204 and between the receiving circuit 202 and the duplexer 204, respectively. In this structure, it is possible to prevent contamination of a high frequency signal and load change in the power amplifier.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, although the main unit of the conductor cover and the plurality of connecting members of the conductor cover are formed integrally in the above-described exemplary embodiments, the main unit of the conductor cover and the plurality of connecting members of the conductor cover may be formed separately from each other.

REFERENCE SIGNS LIST

1 NON-RECIPROCAL CIRCUIT ELEMENT
11 CIRCUIT BOARD
12 MAIN UNIT
13 CONDUCTOR COVER
14 FERRITE
17_1, 17_2, 17_3 CONNECTING MEMBER
18_1, 18_2, 18_3 TRANSMISSION LINE

The invention claimed is:

1. A surface mount technology non-reciprocal circuit element comprising:
    a ferromagnetic material placed above a circuit board; and
    a conductor cover composed of a main unit located above the ferromagnetic material and a plurality of connecting members for electrically connecting the main unit with each of a plurality of transmission lines on the circuit board, wherein
    the ferromagnetic material and at least one of the connecting members are formed so as to create, in at least one of gaps between the side surface of the ferromagnetic material and each of the plurality of connecting members, a location where a clearance between a side surface of the ferromagnetic material and the connecting member is a first clearance and a location where the clearance is a second clearance different from the first clearance,
    each of the plurality of connecting members has a base part extending radially from an outer edge of the main unit on the same plane as the main unit, an end part electrically connected to the transmission line, and an intermediate part opposite to the side surface of the ferromagnetic material and connecting between the base part and the end part,
    each of the plurality of connecting members is bent at a boundary between the base part and the intermediate part and at a boundary between the intermediate part and the end part, and
    at least one of the plurality of connecting members has two or more bent points in the intermediate part.

2. The non-reciprocal circuit element according to claim 1, wherein
    at least one of the plurality of connecting members is formed so that a gap between the side surface of the ferromagnetic material and the intermediate part becomes wider toward the circuit board.

3. The non-reciprocal circuit element according to claim 1, wherein
    at least one of the plurality of connecting members is formed so that a gap between the side surface of the ferromagnetic material and the intermediate part becomes narrower toward the circuit board.

4. The non-reciprocal circuit element according to claim 1, wherein
    at least one of the plurality of connecting members has, in the intermediate part, a protrusion with an end in close proximity to the side surface of the ferromagnetic material.

5. The non-reciprocal circuit element according to claim 1, wherein the ferromagnetic material has a shape where a plurality of cylinders with different diameters are placed on top of each other coaxially in a direction perpendicular to the circuit board.

6. The non-reciprocal circuit element according to claim 1, wherein the ferromagnetic material is formed so as to taper from an upper surface to a lower surface.

7. The non-reciprocal circuit element according to claim 1, wherein a silver thick film is formed on a lower surface of the ferromagnetic material.

8. The non-reciprocal circuit element according to claim 1, wherein, in the conductor cover, the main unit and the connecting members are integrally formed.

9. A wireless communication device including the non-reciprocal circuit element according to claim 1, comprising:
    the non-reciprocal circuit element;
    a transmitting circuit;
    a receiving circuit;
    an antenna; and
    a branching filter connected to the antenna, wherein
    the non-reciprocal circuit element is connected between the transmitting circuit and the branching filter or between the receiving circuit and the branching filter.

* * * * *